(12) United States Patent
Gao et al.

(10) Patent No.: US 12,608,854 B2
(45) Date of Patent: Apr. 21, 2026

(54) SYSTEMS AND METHODS FOR TEETH WHITENING SIMULATION

(71) Applicant: Align Technology, Inc., San Jose, CA (US)

(72) Inventors: Yun Gao, Cary, NC (US); Chao Shi, Morrisville, NC (US); Christopher E. Cramer, Durham, NC (US)

(73) Assignee: Align Technology, Inc., San Jose, CA (US)

( * ) Notice: Subject to any disclaimer, the term of this patent is extended or adjusted under 35 U.S.C. 154(b) by 28 days.

(21) Appl. No.: 18/465,862

(22) Filed: Sep. 12, 2023

(65) Prior Publication Data

US 2024/0087184 A1 Mar. 14, 2024

Related U.S. Application Data

(60) Provisional application No. 63/405,861, filed on Sep. 12, 2022.

(51) Int. Cl.
| | |
|---|---|
| *G06T 11/00* | (2006.01) |
| *H04N 1/60* | (2006.01) |
| *H04N 1/62* | (2006.01) |

(52) U.S. Cl.
CPC ......... *G06T 11/001* (2013.01); *H04N 1/6075* (2013.01); *H04N 1/608* (2013.01); *H04N 1/622* (2013.01); *G06T 2210/41* (2013.01)

(58) Field of Classification Search
CPC .............. G06T 11/001; G06T 2210/41; G06T 2207/30036; H04N 1/6075; H04N 1/608; H04N 1/622
See application file for complete search history.

(56) References Cited

U.S. PATENT DOCUMENTS

| | | | |
|---|---|---|---|
| 5,975,893 | A | 11/1999 | Chishti et al. |
| 6,227,850 | B1 | 5/2001 | Chishti et al. |

(Continued)

FOREIGN PATENT DOCUMENTS

| | | | | | |
|---|---|---|---|---|---|
| CN | 106726619 | A | * | 5/2017 | .............. A61K 6/78 |
| JP | 2010233236 | A | * | 10/2010 | |

(Continued)

OTHER PUBLICATIONS

Estay et al.; The change of teeth color, whiteness variations and its psychosocial and self-perception effects when using low vs. high concentration bleaching gels: a one-year follow-up. BMC Oral Health; 20(1); pp. 1-9; Dec. 2020.

*Primary Examiner* — Said Broome
*Assistant Examiner* — Denis Vasiliy Minko
(74) *Attorney, Agent, or Firm* — Shay Glenn LLP

(57) ABSTRACT

Methods and systems for simulating dental whitening. A two-dimensional (2D) image of a patient's oral cavity may be converted from a first color space to a CIELAB color space. A change in a blue-yellow color value (delta b value) with which to whiten the patient's teeth may be selected to increase a blue hue and decrease a yellow hue in the 2D image. A threshold lightness value of individual teeth in the 2D image may be identified. The 2D image in the CIELAB color space may be transformed by adjusting delta b values of each tooth based, at least in part, on an evaluation of a lightness value of each tooth relative to the threshold lightness value to form a whitened 2D image. Adjusting the delta b values may include limiting the delta b values to within a predetermined range. A whitened 2D image may be output-ted.

21 Claims, 11 Drawing Sheets

(56) References Cited

U.S. PATENT DOCUMENTS

| | | | |
|---|---|---|---|
| 6,227,851 B1 | 5/2001 | Chishti et al. | |
| 6,299,440 B1 | 10/2001 | Phan et al. | |
| 6,318,994 B1 | 11/2001 | Chishti et al. | |
| 6,371,761 B1 | 4/2002 | Cheang et al. | |
| 6,386,878 B1 | 5/2002 | Pavlovskaia et al. | |
| 6,406,292 B1 | 6/2002 | Chishti et al. | |
| 6,409,504 B1 | 6/2002 | Jones et al. | |
| 6,457,972 B1 | 10/2002 | Chishti et al. | |
| 6,461,158 B1 | 10/2002 | Sagel et al. | |
| 6,488,499 B1 | 12/2002 | Miller | |
| 6,514,074 B1 | 2/2003 | Chishti et al. | |
| 6,554,611 B2 | 4/2003 | Chishti et al. | |
| 6,582,229 B1 | 6/2003 | Miller et al. | |
| 6,602,070 B2 | 8/2003 | Miller et al. | |
| 6,621,491 B1 | 9/2003 | Baumrind et al. | |
| 6,688,886 B2 | 2/2004 | Hughes et al. | |
| 6,726,478 B1 | 4/2004 | Isiderio et al. | |
| 6,729,876 B2 | 5/2004 | Chishti et al. | |
| 6,739,869 B1 | 5/2004 | Taub et al. | |
| 6,767,208 B2 | 7/2004 | Kaza | |
| 6,783,360 B2 | 8/2004 | Chishti | |
| 7,040,896 B2 | 5/2006 | Pavlovskaia et al. | |
| 7,063,532 B1 | 6/2006 | Jones et al. | |
| 7,074,038 B1 | 7/2006 | Miller | |
| 7,074,039 B2 | 7/2006 | Kopelman et al. | |
| 7,077,647 B2 | 7/2006 | Choi et al. | |
| 7,108,508 B2 | 9/2006 | Hedge et al. | |
| 7,134,874 B2 | 11/2006 | Chishti et al. | |
| 7,156,661 B2 | 1/2007 | Choi et al. | |
| 7,160,107 B2 | 1/2007 | Kopelman et al. | |
| 7,227,666 B1 * | 6/2007 | MacLeod | H04N 1/6052 |
| | | | 358/1.9 |
| 7,241,142 B2 | 7/2007 | Abolfathi et al. | |
| 7,293,988 B2 | 11/2007 | Wen | |
| 7,309,230 B2 | 12/2007 | Wen | |
| 7,357,634 B2 | 4/2008 | Knopp | |
| 7,555,403 B2 | 6/2009 | Kopelman et al. | |
| 7,637,740 B2 | 12/2009 | Knopp | |
| 7,689,398 B2 | 3/2010 | Cheng et al. | |
| 7,736,147 B2 | 6/2010 | Kaza et al. | |
| 7,746,339 B2 | 6/2010 | Matov et al. | |
| 7,844,356 B2 | 11/2010 | Matov et al. | |
| 7,844,429 B2 | 11/2010 | Matov et al. | |
| 7,865,259 B2 | 1/2011 | Kuo et al. | |
| 7,878,804 B2 | 2/2011 | Korytov et al. | |
| 7,880,751 B2 | 2/2011 | Kuo et al. | |
| 7,904,308 B2 | 3/2011 | Arnone et al. | |
| 7,930,189 B2 | 4/2011 | Kuo | |
| 7,942,672 B2 | 5/2011 | Kuo | |
| 7,970,627 B2 | 6/2011 | Kuo et al. | |
| 7,970,628 B2 | 6/2011 | Kuo et al. | |
| 8,038,444 B2 | 10/2011 | Kitching et al. | |
| 8,044,954 B2 | 10/2011 | Kitching et al. | |
| 8,075,306 B2 | 12/2011 | Kitching et al. | |
| 8,092,215 B2 | 1/2012 | Stone-Collonge et al. | |
| 8,099,268 B2 | 1/2012 | Kitching et al. | |
| 8,108,189 B2 | 1/2012 | Chelnokov et al. | |
| 8,126,726 B2 | 2/2012 | Matov et al. | |
| 8,260,591 B2 | 9/2012 | Kass et al. | |
| 8,275,180 B2 | 9/2012 | Kuo | |
| 8,401,826 B2 | 3/2013 | Cheng et al. | |
| 8,439,672 B2 | 5/2013 | Matov et al. | |
| 8,562,338 B2 | 10/2013 | Kitching et al. | |
| 8,591,225 B2 | 11/2013 | Wu et al. | |
| 8,788,285 B2 | 7/2014 | Kuo | |
| 8,843,381 B2 | 9/2014 | Kuo et al. | |
| 8,874,452 B2 | 10/2014 | Kuo | |
| 8,896,592 B2 | 11/2014 | Boltunov et al. | |
| 8,930,219 B2 | 1/2015 | Trosien et al. | |
| 9,037,439 B2 | 5/2015 | Kuo et al. | |
| 9,060,829 B2 | 6/2015 | Sterental et al. | |
| 9,125,709 B2 | 9/2015 | Matty | |
| 9,211,166 B2 | 12/2015 | Kuo et al. | |
| 9,220,580 B2 | 12/2015 | Borovinskih et al. | |
| 9,256,950 B1 * | 2/2016 | Xu | G06T 11/60 |

| | | | |
|---|---|---|---|
| 9,364,296 B2 | 6/2016 | Kuo | |
| 9,375,300 B2 | 6/2016 | Matov et al. | |
| 9,414,897 B2 | 8/2016 | Wu et al. | |
| 9,492,245 B2 | 11/2016 | Sherwood et al. | |
| 9,642,678 B2 | 5/2017 | Kuo | |
| 10,248,883 B2 | 4/2019 | Borovinskih et al. | |
| 10,342,638 B2 | 7/2019 | Kitching et al. | |
| 10,463,452 B2 | 11/2019 | Matov et al. | |
| 10,595,966 B2 | 3/2020 | Carrier, Jr. et al. | |
| 10,617,489 B2 | 4/2020 | Grove et al. | |
| 10,722,328 B2 | 7/2020 | Velazquez et al. | |
| 10,758,322 B2 | 9/2020 | Pokotilov et al. | |
| 10,779,718 B2 | 9/2020 | Meyer et al. | |
| 10,792,127 B2 | 10/2020 | Kopelman et al. | |
| 10,828,130 B2 | 11/2020 | Pokotilov et al. | |
| 10,835,349 B2 | 11/2020 | Cramer et al. | |
| 10,973,611 B2 | 4/2021 | Pokotilov et al. | |
| 10,996,813 B2 | 5/2021 | Makarenkova et al. | |
| 10,997,727 B2 | 5/2021 | Xue et al. | |
| 11,020,205 B2 | 6/2021 | Li et al. | |
| 11,020,206 B2 | 6/2021 | Shi et al. | |
| 11,026,766 B2 | 6/2021 | Chekh et al. | |
| 11,033,359 B2 | 6/2021 | Velazquez et al. | |
| 11,071,608 B2 | 7/2021 | Derakhshan et al. | |
| 11,096,763 B2 | 8/2021 | Akopov et al. | |
| 11,116,605 B2 | 9/2021 | Nyukhtikov et al. | |
| 11,147,652 B2 | 10/2021 | Mason et al. | |
| 11,151,753 B2 | 10/2021 | Gao et al. | |
| 11,154,381 B2 | 10/2021 | Roschin et al. | |
| 11,259,896 B2 | 3/2022 | Matov et al. | |
| 11,357,598 B2 | 6/2022 | Cramer | |
| 11,395,717 B2 | 7/2022 | Yuryev et al. | |
| 11,432,908 B2 | 9/2022 | Kopelman et al. | |
| 11,464,604 B2 | 10/2022 | Makarenkova et al. | |
| 11,478,334 B2 | 10/2022 | Matov et al. | |
| 11,484,389 B2 | 11/2022 | Sterental et al. | |
| 11,521,732 B2 | 12/2022 | Levin et al. | |
| 11,534,272 B2 | 12/2022 | Li et al. | |
| 11,553,988 B2 | 1/2023 | Mednikov et al. | |
| 11,633,268 B2 | 4/2023 | Moalem et al. | |
| 11,642,195 B2 | 5/2023 | Gao et al. | |
| 11,651,494 B2 | 5/2023 | Brown et al. | |
| 11,654,001 B2 | 5/2023 | Roschin et al. | |
| 11,707,344 B2 | 7/2023 | Roschin et al. | |
| 11,810,271 B2 | 11/2023 | Shi et al. | |
| 2003/0008259 A1 | 1/2003 | Kuo et al. | |
| 2003/0143509 A1 | 7/2003 | Kopelman et al. | |
| 2003/0207227 A1 | 11/2003 | Abolfathi | |
| 2004/0137400 A1 | 7/2004 | Chishti et al. | |
| 2004/0152036 A1 | 8/2004 | Abolfathi | |
| 2004/0197728 A1 | 10/2004 | Abolfathi et al. | |
| 2004/0259049 A1 | 12/2004 | Kopelman et al. | |
| 2005/0182654 A1 | 8/2005 | Abolfathi et al. | |
| 2005/0244791 A1 | 11/2005 | Davis et al. | |
| 2006/0127836 A1 | 6/2006 | Wen | |
| 2006/0127852 A1 | 6/2006 | Wen | |
| 2006/0127854 A1 | 6/2006 | Wen | |
| 2006/0275731 A1 | 12/2006 | Wen et al. | |
| 2006/0275736 A1 | 12/2006 | Wen et al. | |
| 2008/0306724 A1 | 12/2008 | Kitching et al. | |
| 2010/0009308 A1 | 1/2010 | Wen et al. | |
| 2010/0068672 A1 | 3/2010 | Arjomand et al. | |
| 2010/0068676 A1 | 3/2010 | Mason et al. | |
| 2010/0092907 A1 | 4/2010 | Knopp | |
| 2010/0167243 A1 | 7/2010 | Spiridonov et al. | |
| 2013/0204599 A1 | 8/2013 | Matov et al. | |
| 2014/0011162 A1 * | 1/2014 | Zegarelli | H02K 11/215 |
| | | | 433/215 |
| 2015/0161804 A1 * | 6/2015 | Ohishi | H04N 1/6058 |
| | | | 345/590 |
| 2016/0310235 A1 | 10/2016 | Derakhshan et al. | |
| 2017/0273760 A1 | 9/2017 | Morton et al. | |
| 2018/0280118 A1 | 10/2018 | Cramer | |
| 2019/0328487 A1 | 10/2019 | Levin et al. | |
| 2019/0328488 A1 | 10/2019 | Levin et al. | |
| 2020/0155274 A1 | 5/2020 | Pimenov et al. | |
| 2020/0254583 A1 * | 8/2020 | Kutscha | G01B 11/303 |

(56)        References Cited

U.S. PATENT DOCUMENTS

| | | | |
|---|---|---|---|
| 2020/0297458 | A1 | 9/2020 | Roschin et al. |
| 2020/0306011 | A1 | 10/2020 | Chekhonin et al. |
| 2021/0134436 | A1 | 5/2021 | Meyer et al. |

FOREIGN PATENT DOCUMENTS

| | | | | | |
|---|---|---|---|---|---|
| KR | 20200023225 | A | * | 3/2020 | .............. G06T 7/11 |
| KR | 102286717 | B1 | | 8/2021 | |
| KR | 20210139345 | A | * | 11/2021 | .............. G01J 3/508 |
| PH | 12013501019 | B1 | | 6/2019 | |
| WO | WO-2019018345 | A1 | * | 1/2019 | .............. C08L 25/14 |

* cited by examiner

300

313

312

330

310

320

311

400
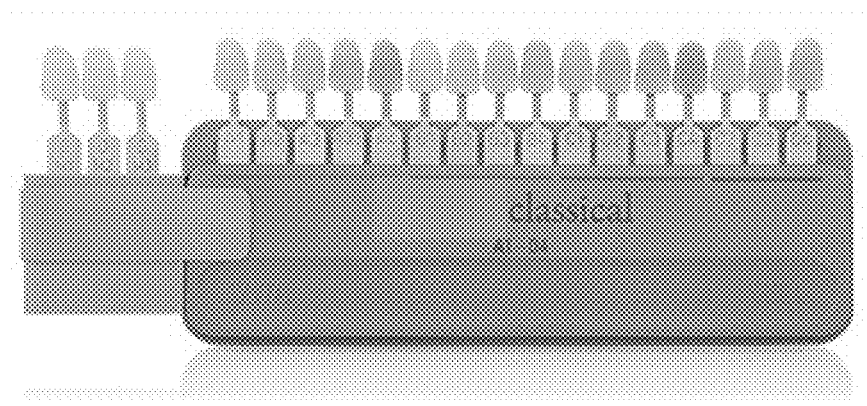
FIG. 4A
410
FIG. 4B

500

Receive 2D dental image of the patient .
502

Segment 2D dental image.
504

Convert color component information from first color
space to second color space.
506

Simulate tooth whitening procedure.
508

Convert color component information from second
color space to first color space.
510

Display 2D image of simulated whitened teeth.
512

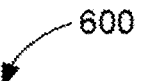
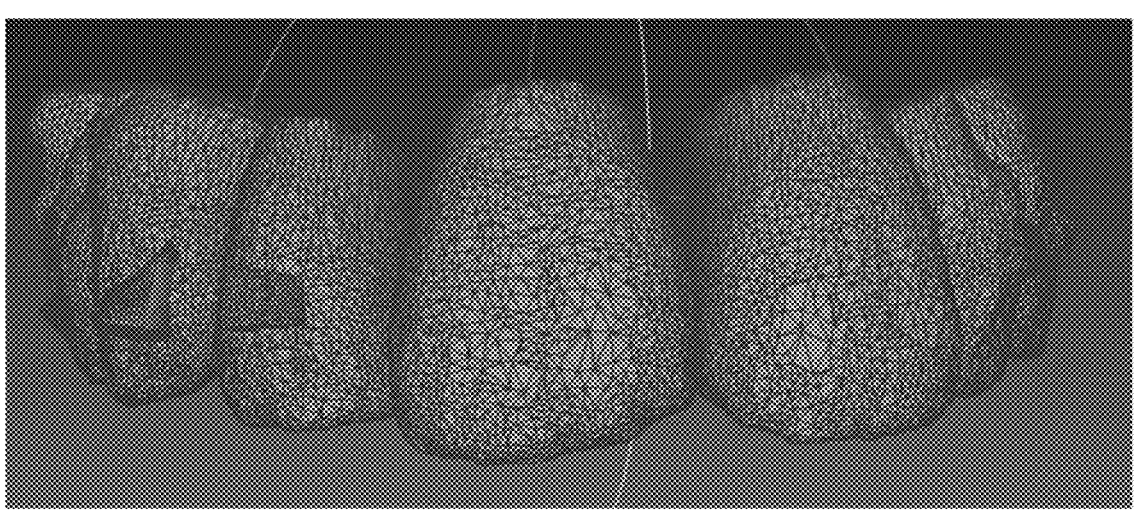
FIG. 6

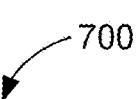

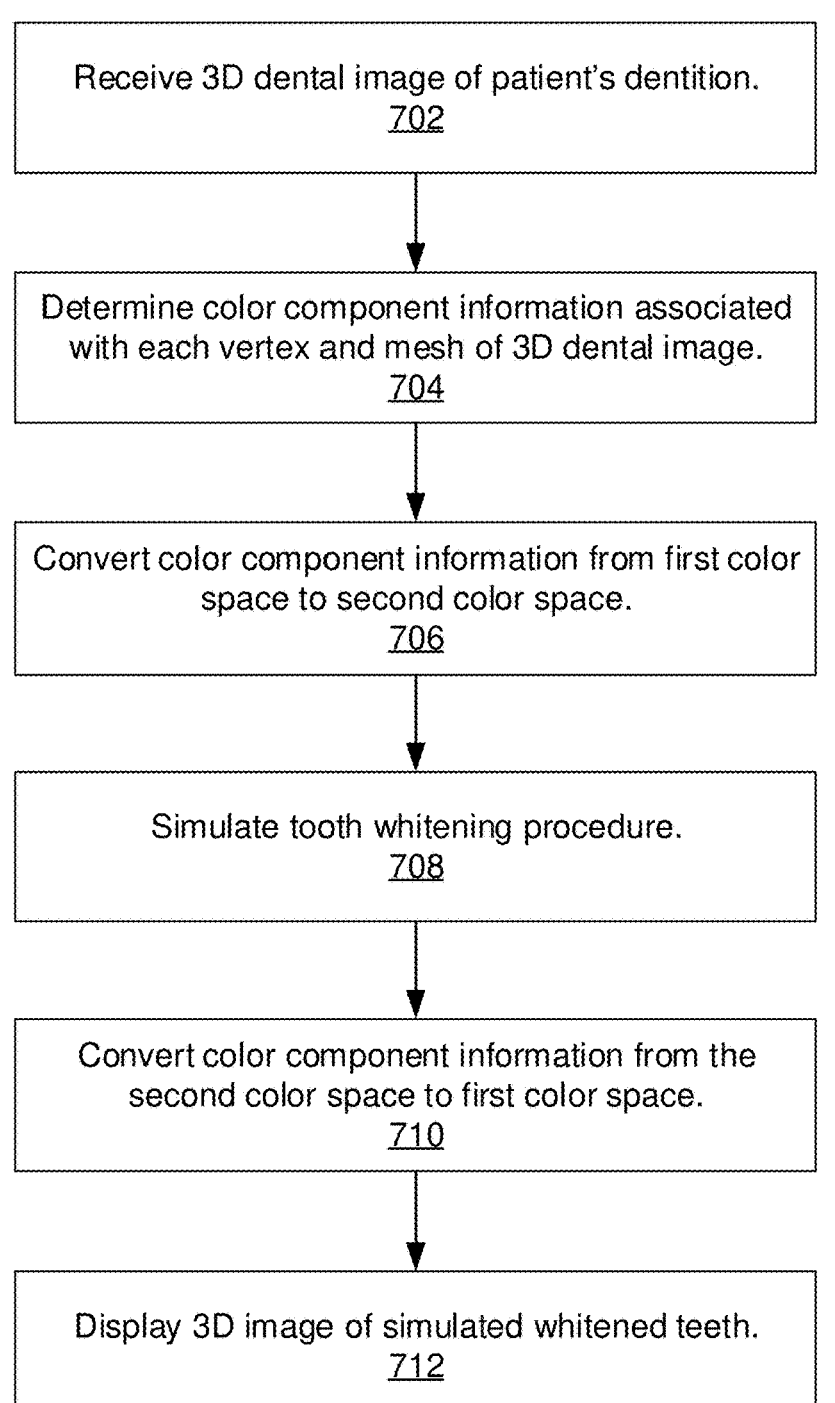

Receive 3D dental image of patient's dentition.
702

Determine color component information associated with each vertex and mesh of 3D dental image.
704

Convert color component information from first color space to second color space.
706

Simulate tooth whitening procedure.
708

Convert color component information from the second color space to first color space.
710

Display 3D image of simulated whitened teeth.
712

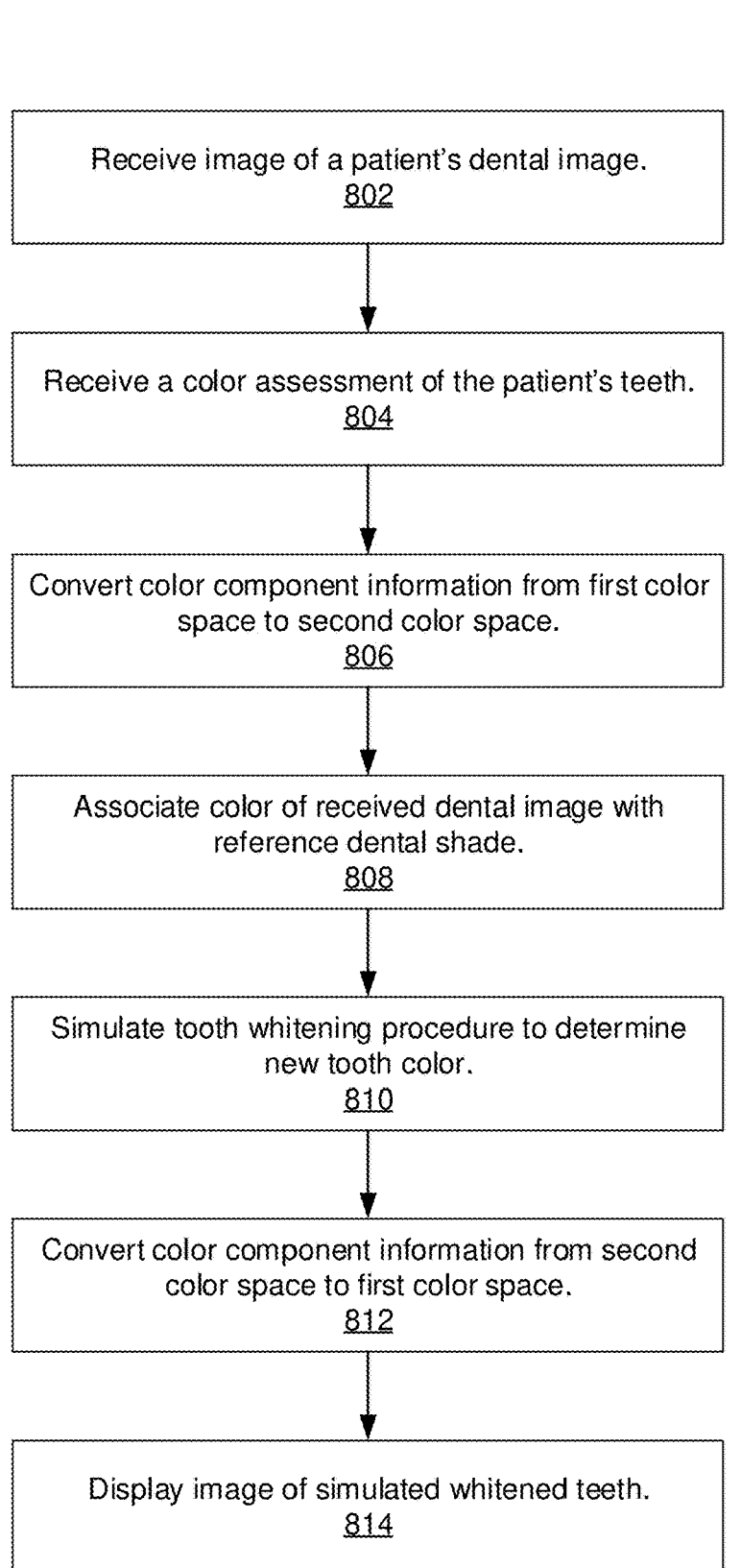

Receive image of a patient's dental image.
802

Receive a color assessment of the patient's teeth.
804

Convert color component information from first color space to second color space.
806

Associate color of received dental image with reference dental shade.
808

Simulate tooth whitening procedure to determine new tooth color.
810

Convert color component information from second color space to first color space.
812

Display image of simulated whitened teeth.
814

FIG. 8

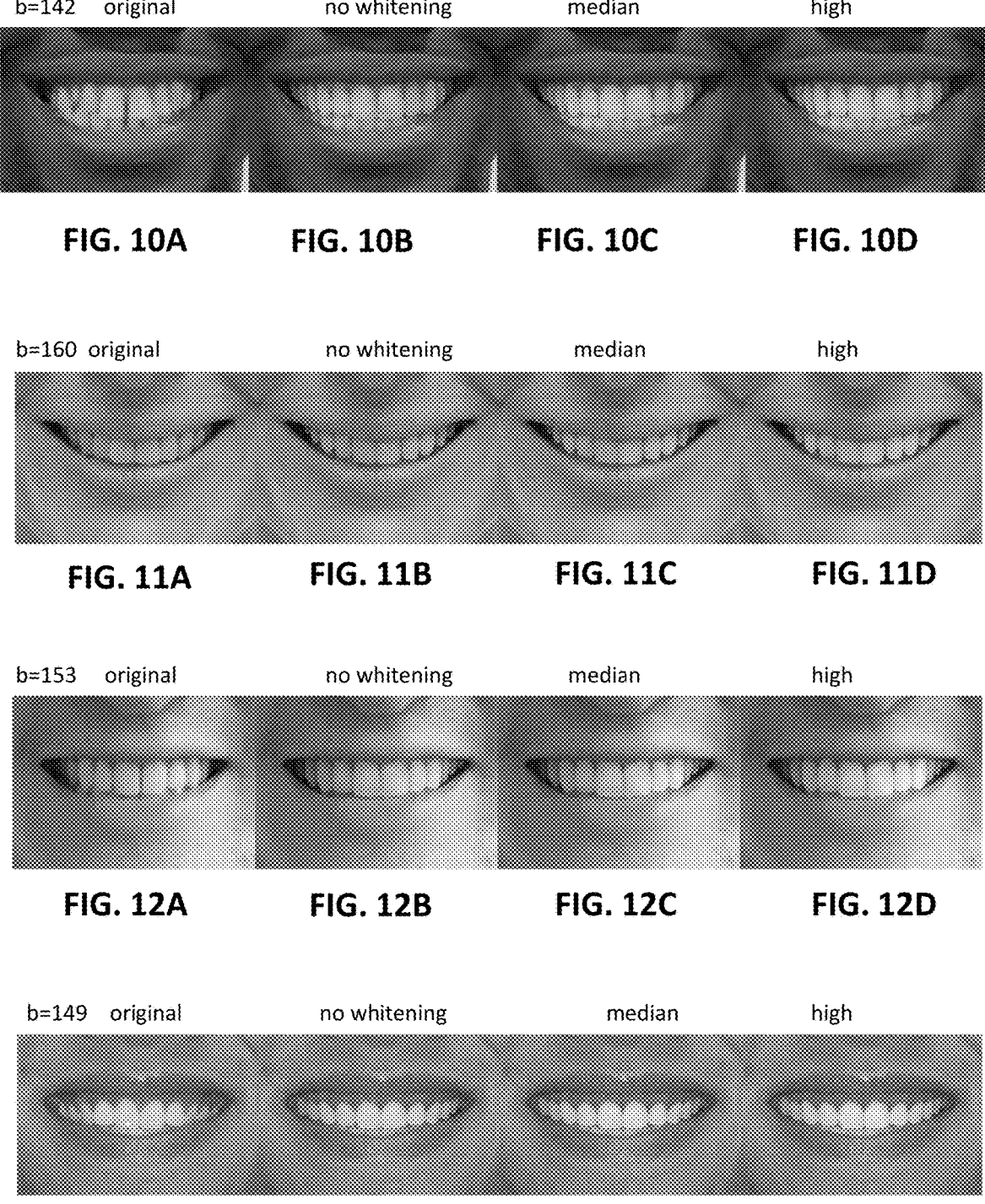
b=142    original          no whitening          median          high
FIG. 10A          FIG. 10B          FIG. 10C          FIG. 10D
b=160  original          no whitening          median          high
FIG. 11A          FIG. 11B          FIG. 11C          FIG. 11D
b=153    original          no whitening          median          high
FIG. 12A          FIG. 12B          FIG. 12C          FIG. 12D
b=149    original          no whitening          median          high
FIG. 13A          FIG. 13B          FIG. 13C          FIG. 13D b=146    original                no whitening                median                high
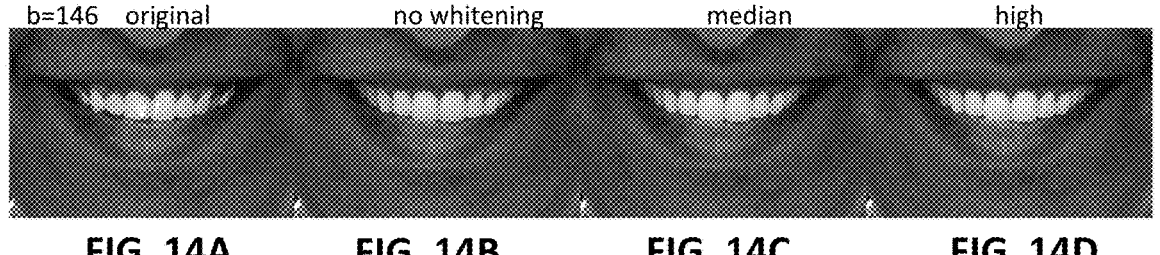
FIG. 14A        FIG. 14B        FIG. 14C        FIG. 14D
b=145    original                no whitening                median                high
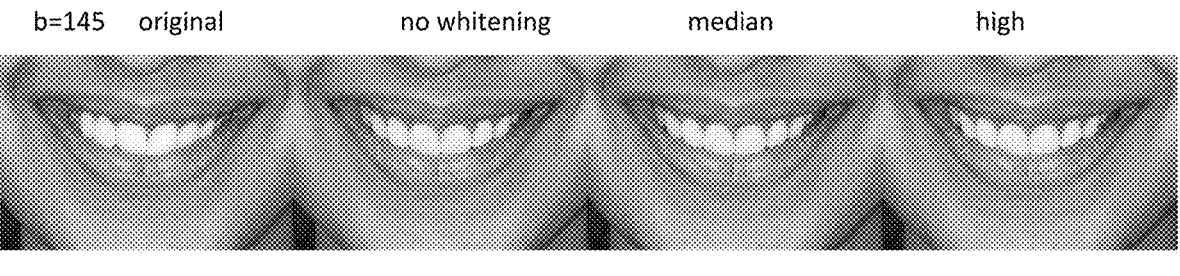
FIG. 15A        FIG. 15B        FIG. 15C        FIG. 15D

SYSTEMS AND METHODS FOR TEETH WHITENING SIMULATION

CLAIM OF PRIORITY

This patent application claims priority to U.S. Provisional Patent Application No. 63/405,861, titled "SYSTEMS AND METHODS FOR TEETH WHITENING SIMULATION," filed on Sep. 12, 2022, herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Treatment planning may be used in any medical procedure to help guide a desired outcome. For example, treatment planning may be used in orthodontic and dental treatments using a series of patient-removable appliances (e.g., orthodontic aligners, palatal expanders, etc.) are very useful for treating patients, and in particular for treating malocclusions. Treatment planning is typically performed in conjunction with the dental professional (e.g., dentist, orthodontist, dental technician, etc.), by generating a model of the patient's teeth showing a number of intermediate stages (steps) corresponding to a number of treatment steps.

Existing systems and methods for treatment planning may be time consuming, and may provide limited and/or unrealistic simulation results of teeth whitening procedures to a patient.

SUMMARY OF THE DISCLOSURE

Described herein are systems, methods, and devices for simulating a teeth whitening procedure. In any of the examples described herein, a first dental image may be obtained or received. Color information of the first dental image may be represented in a first color space. Typical first color spaces may be red, green, blue (RGB), cyan, magenta, yellow (CMY) or the like. The color information may be converted from the first color space to a second color space. An example second color space may be an International Commission on Illumination color space (CIELAB). Simulation of teeth whitening procedures may be more easily and readily performed in the second color space. After the color information has been modified in the second color space to simulate teeth whitening, then the color information may be converted back to the first colors space resulting in a second dental image. This second dental image may be displayed to the clinician and/or patient enabling a review of possible outcomes of a teeth whitening procedure.

The methods apparatuses describe herein may relate to dental treatment planning, and more particularly for systems and methods for simulating teeth whitening procedures that may form all or a portion of a dental treatment plan.

For example, described herein are methods of creating an image simulating a dental whitening treatment that include: receiving a two-dimensional (2D) image of a patient's oral cavity; identifying one or more regions of the 2D image corresponding to teeth in the patient's oral cavity; converting the 2D image from a first color space to a second color space; selecting a change in a first color value with which to whiten the patient's teeth, wherein the first color value is selected to modify a plurality of hues in the 2D image; identify a threshold lightness value of the individual teeth in the 2D image; transforming the 2D image in the second color space by adjusting the first color values of each tooth by modifying the first color value for each tooth based, at least in part, on an evaluation of a lightness value of each tooth relative to the threshold lightness value to form a whitened 2D image; and outputting the whitened 2D image.

The 2D image of the patient's oral cavity may generally comprise a 2D image of the patient's teeth. In some examples the image may include the lips, gums, etc.

The first color space may comprise a native color space and the second color space may comprise a CIELAB color space or other perceptually linear color space, such as CIELUV, CIECAM2, OSA-UCS, IPT, etc.

The first color value may comprise a blue-yellow color value. The color values may generally be relevant to whitening of teeth. The first color value may comprise a delta color value. The first color value may comprise a delta b color value. In some examples the first color value is selected to increase a first hue and decrease a second hue. The first color value may be selected to increase a blue hue and decrease a yellow hue.

In any of these examples the threshold lightness value may comprise a maximum color value of the individual teeth in the 2D image. Modifying the first color value may comprise scaling a delta b value for each tooth. The evaluation of the lightness value may comprise evaluation of a ratio of the lightness value of each tooth relative to the threshold lightness value. The evaluation of the lightness value may comprise evaluation of a ratio of the lightness value of each tooth relative to a maximum lightness value.

For example, described herein is a method for creating and displaying a simulation of a teeth whitening treatment. The method may include receiving a first two-dimensional (2D) dental image of a patient's teeth, wherein color of the first 2D dental image is described by first color components in a first color space, segmenting the first 2D dental image to determine individual teeth, and segmenting the first 2D dental image to determine individual teeth. The method may further include simulating a teeth whitening procedure to modify the second color components into third color components in the second color space, wherein the teeth whitening procedure is based at least in part on a maximum valued second color component of the individual teeth, converting the third color components into fourth color components in the first color space, and displaying a second 2D dental image of the patient's teeth, wherein color of the second 2D dental image is described by the fourth color components.

In some examples, the maximum valued second color component may be a perceptual lightness component.

The teeth whitening procedure may modify a perceptual lightness component of the second color components based on a ratio of a maximum value perceptual lightness component to values of perceptual lightness components of individual teeth.

In any of the methods described herein, the second color space may include a perceptual lightness component, a red/green color component, and a blue/yellow color component. Furthermore, in any of the methods described herein, the teeth whitening procedure may include maintaining a constant value of the red/green color component. In some examples, the teeth whitening procedure may include increasing the perceptual lightness component and decreasing the blue/yellow color component. In some examples, the changes to the blue/yellow color component may be limited to a predetermined value.

Also described herein is a system for simulating a tooth whitening procedure. The system may include one or more processors and a memory configured to store instructions that, when executed by the one or more processors, cause the system to receive a first two-dimensional (2D) dental image of a patient's teeth, wherein color of the first 2D dental image is described by first color components in a first color space, segment the first 2D dental image to determine individual teeth, and convert the first color components to second color components in a second color space, wherein the second color space is an International Commission on Illumination color space (CIELAB). The system may further include instructions to simulate a teeth whitening procedure to modify the second color components into third color components in the second color space, wherein the teeth whitening procedure is based at least in part on a maximum valued second color component of the individual teeth, convert the third color components into fourth color components in the first color space, and a display configured to show a second 2D dental image of the patient's teeth, wherein color of the second 2D dental image is described by the fourth color components.

Described herein is a non-transitory computer-readable storage medium comprising instructions that, when executed by one or more processors of a device, cause the device to perform operations including receiving a first two-dimensional (2D) dental image of a patient's teeth, wherein color of the first 2D dental image is described by first color components in a first color space, segmenting the first 2D dental image to determine individual teeth, converting the first color components to second color components in a second color space, wherein the second color space is an International Commission on Illumination color space (CIELAB), simulating a teeth whitening procedure to modify the second color components into third color components in the second color space, wherein the teeth whitening procedure is based at least in part on a maximum valued second color component of the individual teeth, converting the third color components into fourth color components in the first color space, and displaying a second 2D dental image of the patient's teeth, wherein color of the second 2D dental image is described by the fourth color components.

Also described herein is a method of creating a visualization corresponding to a dental whitening treatment. The method may include receiving a first three-dimensional (3D) dental image of a patient's teeth, determining a 3D mesh associated with the first 3D dental image, wherein the 3D mesh includes a plurality of vertices and meshes, determining first color components in a first color space associated with each of the vertices and meshes, converting the first color components to second color components in a second color space, wherein the second color space is an International Commission on Illumination color space (CIELAB), simulating a teeth whitening procedure to modify the second color components into third color components in the second color space, converting the third color components into fourth color components in the first color space, and displaying a second 3D dental image of the patient's teeth, wherein the second 3D dental image includes vertices and meshes with the fourth color components.

In any of the methods described herein, the second color space may include a perceptual lightness component, a red/green color component, and a blue/yellow color component.

In some examples, the teeth whitening procedure may include increasing values of the perceptual lightness component and decreasing values of the blue/yellow color component. Furthermore, in any of the examples the teeth whitening procedure may maintain a constant value of the red/green color component.

The teeth whitening procedure may include determining first values of the second color components, and determining second values of the second color components based on a predetermined ratio between two of the second color components.

In some examples, the method may include displaying the second 3D dental image on a user display. The method may also include displaying, on a user display, a visual whitening control, wherein the simulation of the teeth whitening is controlled by a user moving the visual whitening control.

Described herein is a system for simulating a teeth whitening procedure. The system may include one or more processors and a memory configured to store instructions that, when executed by the one or more processors, cause the system to receive a first three-dimensional (3D) dental image of a patient's teeth, determine a 3D mesh associated with the first 3D dental image, wherein the 3D mesh includes a plurality of vertices and meshes, determine first color components in a first color space associated with each of the vertices and meshes, convert the first color components to second color components in a second color space, wherein the second color space is an International Commission on Illumination color space (CIELAB), simulate a teeth whitening procedure to modify the second color components into third color components in the second color space, convert the third color components into fourth color components in the first color space, and display a second 3D dental image of the patient's teeth, wherein the second 3D dental image includes vertices and meshes with the fourth color components.

Described herein is a non-transitory computer-readable storage medium comprising instructions that, when executed by one or more processors of a device, cause the device to perform operations that may include receiving a first three-dimensional (3D) dental image of a patient's teeth, determining a 3D mesh associated with the first 3D dental image, wherein the 3D mesh includes a plurality of vertices and meshes, determining first color components in a first color space associated with each of the vertices and meshes, converting the first color components to second color components in a second color space, wherein the second color space is an International Commission on Illumination color space (CIELAB), simulating a teeth whitening procedure to modify the second color components into third color components in the second color space, converting the third color components into fourth color components in the first color space, and displaying a second 3D dental image of the patient's teeth, wherein the second 3D dental image includes vertices and meshes with the fourth color components.

Also described herein is a method of creating a visualization corresponding to a dental whitening treatment, the method comprising receiving a first dental image of a patient's teeth, wherein color of the first dental image is described by first color components in a first color space, receiving, from a clinician, an indication of a current dental shade associated with the patient's teeth and a desired dental shade, converting the first color components to second color components in a second color space, simulating a teeth whitening procedure to modify the second color components to third color components based on the desired dental shade, converting the third color components to fourth color components in the first color space, and displaying a second dental image of the patient's teeth, wherein color the second dental image is described by the fourth color components.

In any of the methods described herein the current and desired dental shades may be members of a reference dental shade guide. The teeth whitening procedure may be based on a characterization of reference dental shades. Furthermore, in some examples, the characterization of the reference dental shades may associate color components in the second color space to individual reference dental shades.

In any of the methods described herein, the second color space may be an International Commission on Illumination color space (CIELAB). Furthermore, the second color components may include a perceptual lightness component, a red/green color component, and a blue/yellow color component. The teeth whitening procedure may include comprises increasing values of the perceptual lightness component and decreasing values of the blue/yellow color component.

Described herein is a system for simulating a teeth whitening procedure, the system may include one or more processors, and a memory configured to store instructions that, when executed by the one or more processors, cause the system to receive a first dental image of a patient's teeth, wherein color of the first dental image is described by first color components in a first color space, receive, from a clinician, an indication of a current dental shade associated with the patient's teeth and a desired dental shade, convert the first color components to second color components in a second color space, simulate a teeth whitening procedure to modify the second color components to third color components based on the desired dental shade, convert the third color components to fourth color components in the first color space, and display a second dental image of the patient's teeth, wherein color the second dental image is described by the fourth color components.

Described herein is a non-transitory computer-readable storage medium comprising instructions that, when executed by one or more processors of a device, cause the device to perform operations comprising receiving a first dental image of a patient's teeth, wherein color of the first dental image is described by first color components in a first color space, receiving, from a clinician, an indication of a current dental shade associated with the patient's teeth and a desired dental shade, converting the first color components to second color components in a second color space, simulating a teeth whitening procedure to modify the second color components to third color components based on the desired dental shade, converting the third color components to fourth color components in the first color space, and displaying a second dental image of the patient's teeth, wherein color the second dental image is described by the fourth color components.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

FIGS. 4A and 4B show example reference dental shade guides.

FIG. 6 shows an example illustration of a 3D dental image.

FIG. 7 is a flowchart showing an example method for simulating teeth whitening operations.

FIG. 8 is a flowchart showing an example method for simulating teeth whitening operations.

FIGS. 10A-10D illustrate an example of simulated teeth whitening as described herein.

FIGS. 11A-11D illustrate an example of simulated teeth whitening as described herein.

FIGS. 12A-12D illustrate an example of simulated teeth whitening as described herein.

FIGS. 13A-13D illustrate an example of simulated teeth whitening as described herein.

FIGS. 14A-14D illustrate an example of simulated teeth whitening as described herein.

FIGS. 15A-15D illustrate an example of simulated teeth whitening as described herein.

DETAILED DESCRIPTION

In general, medical treatment planning may allow users to create patient-customized treatment protocols. For example, orthodontic and/or dental treatment planning allows users to create patient-customized treatment protocols. Some protocols may include procedures to whiten a patient's teeth. Treatment planning involving teeth whitening may benefit from showing the patient expected (simulated) results of various teeth whitening procedures. However, if the simulation results are inaccurate or appear unrealistic, then the patient may become hesitant to proceed with any or all of the treatment plan.

The present disclosure is related to systems, methods, computing device readable media, and devices that solve technical problems related to treatment planning including, in particular, dental treatment planning. Automated agents may be used to aid in displaying possible patient-specific outcomes related to proposed teeth whitening procedures. In some implementations, actual dental shade information may be used with one or more sets of patient data (e.g., scans of a patient's teeth) to generate two-dimensional or three-dimensional images that reflect possible outcomes of one or more teeth whitening procedures.

Figure 1:
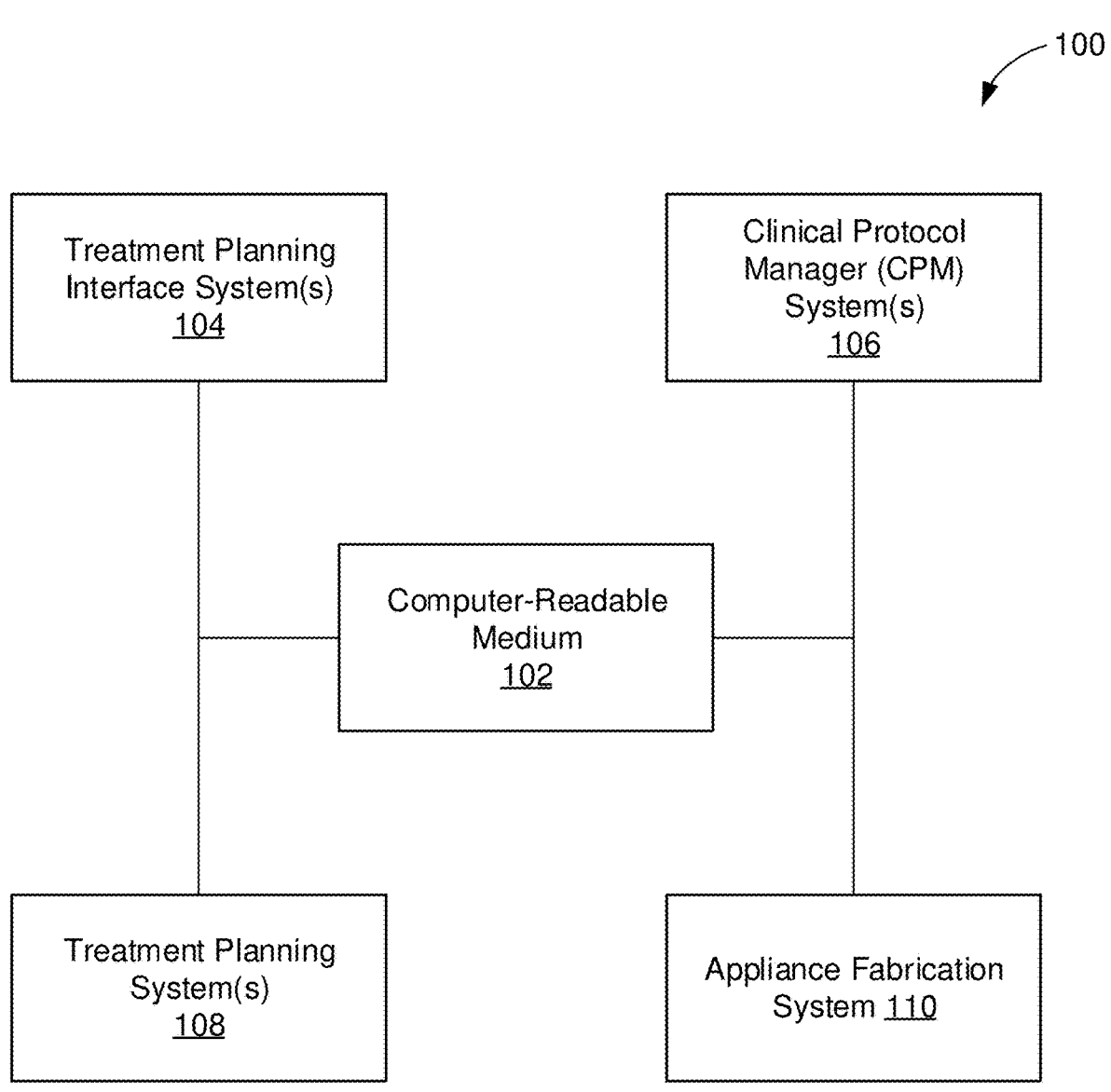
FIG. 1 is a diagram showing an example of systems in a device planning environment.

FIG. 1 is a diagram showing an example of systems in a device planning environment 100. The device planning environment 100 may include a computer-readable medium 102, treatment planning interface system(s) 104, a clinical protocol manager (CPM) system(s) 106, treatment planning system(s) 108, and appliance fabrication system(s) 110. One or more of the components (including modules) of the device planning environment 100 may be coupled to one another (e.g., through the example couplings shown in FIG. 1) or to modules not explicitly shown in FIG. 1. The computer-readable medium 102 may include any computer-readable medium, including without limitation a bus, a wired network, a wireless network, or some combination thereof.

A computer system can be implemented as an engine, as part of an engine or through multiple engines. As used herein, an engine may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores (e.g., data bases or other warehouses of data) are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The treatment planning interface system(s) 104 may include one or more computer systems configured to interact with users and provide users with the ability to manage treatment plans for patients. A "user," in this context, may refer to any individual who can access and/or use the treatment planning interface system(s) 104, and can include any medical professional, including dentists, orthodontists, podiatrists, medical doctors, surgeons, clinicians, etc.

In some implementations, the treatment planning interface system(s) 104 includes engines to gather patient data related to patients who are to be treated according to a treatment plan.

"Patient data," as used herein, may include data related to a patient. Patient data may include representations of anatomical information, such as information about specific portions of the human body to be treated. Examples of anatomical information include representations of a patient's dentition, bones, organs, etc. at a specific time. Patient data may represent anatomical information before, during, or after a treatment plan. As examples, patient data may represent the state and/or intended state of a patient's dentition before, during, or after orthodontic or restorative treatment plans. Patient data may be captured using a variety of techniques, including from a scan, digitized impression, etc. of the patient's anatomy. Additionally, or alternatively, patient data may include patient oral scan information. For example, patient information may include 2D panoramic radiograph data and/or 3D intraoral scan data of a patient's teeth and (in some cases) surrounding bone structure.

A "treatment plan," as used herein, may include a set of instructions to treat a medical condition. A treatment plan may specify, without limitation treatment goals, specific appliances used to implement the goals, milestones to measure progress, and other information, such as treatment length and/or treatment costs. As noted herein, in some implementations, the treatment planning interface system(s) 104 provides a user with an orthodontic treatment plan to treat malocclusions of teeth. The treatment planning interface system(s) 104 may also provide users with restorative treatment plans for a patient's dentition and other types of medical treatment plans to address medical conditions patients may have. In some implementations, a treatment plan may include an automated and/or real-time treatment plan, such as the treatment plans described in U.S. patent application Ser. No. 16/178,491, entitled "Automated Treatment Planning," the contents of which are incorporated by reference as if set forth fully herein. A treatment plan may also include treatment instructions provided by a treatment technician, such as a treatment technician who provides the treatment plan to the user of the treatment planning interface system(s) 104 through the computer-readable medium 102.

In various implementations, the treatment planning interface system(s) 104 is configured to allow a user to visualize, interact with, and/or fabricate appliances that implement a treatment plan. As an example, the treatment planning interface system(s) 104 may provide a user with a user interface that displays virtual representations of orthodontic appliances that move a patient's teeth from an initial position toward a final position to correct malocclusions of teeth. The treatment planning interface system(s) 104 can similarly display representations of restorative appliances and/or other medical appliances. The treatment planning interface system(s) 104 may allow a user to modify appliances through a UI supported thereon. In various implementations, the treatment planning interface system(s) 104 allows a user to fabricate appliances through, e.g., the appliance fabrication system(s) 110. (It is noted the appliance fabrication system(s) 110 may but need not be remote to the treatment planning interface system(s) 104 and can be located proximate to the treatment planning interface system(s) 104.)

The treatment planning interface system(s) 104 may be configured to provide a user with UIs that allow the user to discuss treatment plans with patients. As an example, the treatment planning interface system(s) 104 may display to the user portions of patient data (e.g., depictions of a condition to be treated) as well as treatment options to correct a condition. The treatment planning interface system(s) 104 may display potential appliances that are prescribed to implement the treatment plan. As an example, the treatment planning interface system(s) 104 may display to the user a series of orthodontic appliances that are configured to move a patient's dentition from a first position toward a target position in accordance with an orthodontic treatment plan. The treatment planning interface system(s) 104 may further be configured to depict the effects of specific appliances at various stages of a treatment plan.

The treatment planning interface system(s) 104 may be configured to allow a user to interact with a treatment plan. In some implementations, the treatment planning interface system(s) 104 allows a user to specify treatment preferences. "Treatment preferences," as used herein, may include specific treatment options and/or treatment tools that a user prefers when treating a condition. Treatment preferences may include clinical settings, treatment goals, appliance attributes, preferred ranges of movement, specific stages to implement a specific procedure, etc. Examples of clinical settings in an orthodontic context include allowing or disallowing a type of treatment, use of various types of movements on specific teeth (e.g., molars), use of specific procedures (e.g., interproximal reduction (IPR)), use of orthodontic attachments on specific teeth, etc. Examples of treatment goals in an orthodontic context include lengths/costs of treatments, specific intended final and/or intermediate positions of teeth, etc. Example ranges of movement in an orthodontic context include specific distances and/or angles teeth are to move over various stages of treatment and/or specific forces to be put on teeth over various stages of treatment. Specific stages to implement a specific procedure include, for instance in the orthodontic context, a specific treatment stage to implement attachments, hooks, bite ramps and/or to perform procedures such as surgery or interproximal reduction.

As discussed further herein, the treatment planning interface system(s) 104 may be configured to provide users with customized GUI elements based on treatment templates that structure their treatment preferences in a manner that is convenient to them. Customized GUI elements may include forms, text boxes, UI buttons, selectable UI elements, etc.). In some implementations, customized GUI elements may list treatment preferences and provide a user with the ability to accept, deny, and/or modify treatment preferences. Customized GUI elements may provide the ability to accept or deny parts of at treatment plan and/or modify portions of a treatment plan. In some implementations, a user's customized GUI elements provide the ability to modify parts of an appliance recommended for a treatment plan. For instance, a treatment-related UI element may provide the ability to modify force systems, velocities of tooth movement, angles and/or orientations of parts of aligners, crowns, veneers, etc. that are implemented at specific stages of an orthodontic or restorative treatment plan.

"Treatment templates," as used herein, may include structured data expressed in "treatment domain-specific protocols." (In some examples, treatment templates are generated by the CPM system(s) 106, stored in datastores on the treatment planning system(s) 108, and parsed by engines on the treatment planning system(s) 108 that create customized GUI elements on the treatment planning interface system(s) 104.)

"Treatment domain-specific protocols," as used herein, may include computer languages, runtime objects (e.g., applications, processes, etc.), interpreted items (e.g., executed scripts), etc. that are specialized to treatment planning. Treatment domain-specific protocols may include attributes that are specialized to patient data and/or the gathering thereof, attributes that are specialized to description and/or interaction with treatment plans, and attributes that are specialized to appliances used to implement a treatment plan. The present disclosure provides a detailed example of orthodontic domain-specific protocols. It is noted the examples herein may apply to restorative and/or dental domain-specific protocols and other medical domain-specific protocols.

In some implementations, treatment templates include customized graphical user interface (GUI) elements. Customized GUI elements may be generated using treatment domain-specific protocols. As noted herein, the treatment templates for a user may be customized based on a template library of treatment templates for other users. As an example, a treatment template for a user may be derived from and/or otherwise based on a treatment template of another user (e.g., the treatment preferences in that treatment template may be derived from and/or otherwise based on treatment preferences of another user). Public templates may provide the basis of deriving treatment preferences of other users. Private templates may provide a basis of deriving treatment preferences of a specific user. Additionally, customized GUI elements may be automatically generated during execution of applications and/or processes on the treatment planning interface system(s) 104. Customized GUI elements may operate to display attributes of treatment plans that are relevant to a specific user.

The CPM system(s) 106 may include one or more computer systems configured to create treatment templates using treatment domain-specific protocols. In some implementations, the CPM system(s) 106 are operated by CPM technicians, who may, but need not, be remote to users of the treatment planning interface system(s) 104. The CPM system(s) 106 may also be operated by automated agents. The CPM system(s) 106 may include tools to create treatment templates for specific users based on unstructured representations of treatment preferences of those users. In some implementations, the CPM system(s) 106 are configured to obtain past treatment preferences for users through telephonic interviews, emails, notes memorializing discussions, etc. The CPM system(s) 106 may provide technicians with editing tools to structure treatment preferences in a manner that can be organized for a treatment domain-specific protocol. In various implementations, the CPM system(s) 106 are configured to support creating and editing of treatment domain-specific protocols. As an example, the CPM system(s) 106 may be configured to allow technicians to create and/or edit treatment domain-specific scripts that structure treatment preferences for a specific user.

Additionally, the CPM system(s) 106 may provide validation tools to validate treatment domain-specific protocols to ensure the treatment domain-specific protocols are accurate or otherwise in line with treatment preferences. As an example, the CPM system(s) 106 may provide a visual depiction of how specific treatment domain-specific protocols would appear in treatment planning software. As noted herein, the CPM system(s) 106 may employ one or more validation metrics to quantify validation. Examples of validation metrics that may be relevant to an orthodontic context include arch expansion metrics per quadrant, overjet metrics, overbite metrics, interincisal angle metrics, and/or flags if a treatment plan conforms with minimal or threshold root movement protocols. The CPM system(s) 106 may include one or more elements of the system 200 shown in FIG. 2.

The treatment planning system(s) 108 may include one or more computer systems configured to provide treatment plans to the treatment planning interface system(s) 104. The treatment planning system(s) 108 may receive patient data and the treatment preferences relevant to a user. The treatment planning system(s) 108 may further provide treatment plans for the patient data that accommodate the treatment preferences relevant to the user. The treatment planning system(s) 108 may implement automated and/or real-time treatment planning as referenced further herein.

The treatment planning systems(s) 108 may include one or more engines configured to simulate teeth whitening treatment on a patient's dentition. The treatment planning systems(s) 108 may receive patient data that includes color information of the patient's teeth. The treatment planning system(s) 108 may also receive an indication regarding how much whitening treatment to simulate. Operation of teeth whitening engines is described in more detail in conjunction with FIGS. 3-8.

The treatment planning system(s) 108 may include one or more engines configured to provide treatment plans to the treatment planning interface system(s) 104. The treatment planning system(s) 108 may receive patient data and the treatment preferences relevant to a user. The treatment planning system(s) 108 may further provide treatment plans for the patient data that accommodate the treatment preferences relevant to the user. In various implementations, the treatment planning system(s) 108 identify and/or calculate treatment plans with instructions treat medical conditions. The treatment plans may specify treatment goals, specific outcomes, intermediate outcomes, and/or recommended appliances used to achieve goals/outcomes. The treatment plan may also include treatment lengths and/or milestones. In various implementations, the treatment planning system(s) 108 calculate orthodontic treatment plans to treat malocclusions of teeth, restorative treatment plans for a patient's dentition, medical treatment plans, etc. The treatment plan may comprise automated and/or real-time elements and may include techniques described in U.S. patent application Ser. No. 16/178,491, entitled "Automated Treatment Planning." In various implementations, the treatment planning system(s) 108 are managed by treatment technicians. As noted herein, the treatment plans may accommodate patient data in light of treatment preferences of users.

The treatment planning system(s) 108 may include engines that allow users of the treatment planning interface system(s) 104 to visualize, interact with, and/or fabricate appliances that implement a treatment plan. The treatment planning system(s) 108 may support UIs that display virtual representations of orthodontic appliances that move a patient's teeth from an initial position toward a final position to correct malocclusions of teeth. The treatment planning system(s) 108 can similarly include engines that configure the treatment planning interface system(s) 104 to display representations of restorative appliances and/or other medical appliances. The treatment planning system(s) 108 may support fabrication of appliances through, e.g., the appliance fabrication system(s) 110.

In some implementations, the treatment planning system(s) 108 provide customized GUIs that allow the user to discuss treatment plans with patients. The treatment planning system(s) 108 may render patient data, conditions to be treated, and/or treatment options for display on the treatment planning interface system(s) 104. The treatment planning system(s) 108 may render potential appliances that are prescribed to implement a treatment plan (e.g., series of orthodontic appliances that are configured to move a patient's dentition from a first position toward a target position in accordance with an orthodontic treatment plan; effects of specific appliances at various stages of a treatment plan, etc.).

The treatment planning system(s) 108 may include engines to support user interaction with treatment plans. The treatment planning system(s) 108 may use treatment preferences, including those generated in treatment domain-specific protocols by the CPM system(s) 106. In various implementations, the treatment planning system(s) 108 provide treatment templates to the treatment planning interface system(s) 104 that structure users' treatment preferences in a manner that is convenient to them. As noted herein, treatment templates may include structured data, UI elements (forms, text boxes, UI buttons, selectable UI elements, etc.), etc.

The treatment planning system(s) 108 may include one or more datastores configured to store treatment templates expressed according to treatment domain-specific protocols. The treatment planning system(s) 108 may further include one or more processing engines to process, e.g., parse, the treatment templates to form customized GUI elements on the treatment planning interface system(s) 104. As noted herein, the processing engines may convert the treatment templates into scripts or other runtime elements in order to support the customized GUI elements on the treatment planning interface system(s) 104. As noted herein, the treatment templates may have been created and/or validated by the CPM system(s) 106.

In some implementations, the treatment planning system(s) 108 provides the treatment planning interface system(s) 104 with customized GUI elements that are generated using treatment domain-specific protocols. The customized GUI elements may be based on treatment templates, which, for a user may be customized based on a template library of treatment templates for other users. The treatment templates may comprise public and/or private treatment In some implementations, the treatment planning system(s) 108 generates customized GUI elements for display by applications and/or processes on the treatment planning interface system(s) 104. Customized GUI elements may operate to display attributes of treatment plans that are relevant to a specific user.

The appliance fabrication system(s) 110 may include one or more computer systems configured to fabricate appliances. As discussed herein, examples of appliances to be fabricated include dental as well as non-dental appliances. Examples of dental appliances include aligners, other polymeric dental appliances, crowns, veneers, bridges, retainers, dental surgical guides, etc. Examples of non-dental appliances include orthotic devices, hearing aids, surgical guides, medical implants, etc.

The appliance fabrication system(s) 110 may comprise thermoforming systems configured to indirectly and/or directly form appliances. The appliance fabrication system(s) 110 may implement instructions to indirectly fabricate appliances. As an example, the appliance fabrication system(s) 110 may be configured to thermoform appliances over a positive or negative mold. Indirect fabrication of a dental appliance can involve one or more of the following steps: producing a positive or negative mold of the patient's dentition in a target arrangement (e.g., by additive manufacturing, milling, etc.), thermoforming one or more sheets of material over the mold in order to generate an appliance shell, forming one or more structures in the shell (e.g., by cutting, etching, etc.), and/or coupling one or more components to the shell (e.g., by extrusion, additive manufacturing, spraying, thermoforming, adhesives, bonding, fasteners, etc.). Optionally, one or more auxiliary appliance components as described herein (e.g., elastics, wires, springs, bars, arch expanders, palatal expanders, twin blocks, occlusal blocks, bite ramps, mandibular advancement splints, bite plates, pontics, hooks, brackets, headgear tubes, bumper tubes, palatal bars, frameworks, pin-and-tube apparatuses, buccal shields, buccinator bows, wire shields, lingual flanges and pads, lip pads or bumpers, protrusions, divots, etc.) are formed separately from and coupled to the appliance shell (e.g., via adhesives, bonding, fasteners, mounting features, etc.) after the shell has been fabricated.

The appliance fabrication system(s) 110 may comprise direct fabrication systems configured to directly fabricate appliances. As an example, the appliance fabrication system(s) 110 may include computer systems configured to use additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can include: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliance fabrication system(s) 110 may be configured to directly fabricate appliances using selective laser sintering. In some embodiments, selective laser sintering involves using a laser beam to selectively melt and fuse a layer of powdered material according to a desired cross-sectional shape in order to build up the object geometry. As yet another example, the appliance fabrication system(s) 110 may be configured to directly fabricate appliances by fused deposition modeling. In some embodiments, fused deposition modeling involves melting and selectively depositing a thin filament of thermoplastic polymer in a layer-by-layer manner in order to form an object. In yet another example, the appliance fabrication system(s) 110 may be configured to implement material jetting to directly fabricate appliances. In some embodiments, material jetting involves jetting or extruding one or more materials onto a build surface in order to form successive layers of the object geometry.

In some embodiments, the appliance fabrication system(s) 110 may include a combination of direct and indirect fabrication systems. In some embodiments, the appliance fabrication system(s) 110 may be configured to build up object geometry in a layer-by-layer fashion, with successive layers being formed in discrete build steps. Alternatively or in combination, the appliance fabrication system(s) 110 may be configured to use a continuous build-up of an object's geometry, referred to herein as "continuous direct fabrication." Various types of continuous direct fabrication systems can be used. As an example, in some embodiments, the appliance fabrication system(s) 110 may use "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Examples of continuous liquid interphase printing systems are described in U.S. Patent Publication Nos. 2015/0097315, 2015/0097316, and 2015/0102532, (corresponding to U.S. Pat. Nos. corresponding to U.S. Pat. Nos. 9,205,601, 9,216,546, and 9,211,678) the disclosures of each of which are incorporated herein by reference in their entirety. As another example, the appliance fabrication system(s) 110 may be configured to achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Example systems are described in U.S. Pat. No. 7,892,474, the disclosure of which is incorporated herein by reference in its entirety.

In another example, the appliance fabrication system(s) 110 may be configured to extrude a composite material composed of a curable liquid material surrounding a solid strand. The composite material can be extruded along a continuous 3D path in order to form the object. Examples systems are described in U.S. Patent Publication No. 2014/0061974, corresponding to U.S. Pat. No. 9,511,543, the disclosures of which are incorporated herein by reference in its entirety.

In yet another example, the appliance fabrication system(s) 110 may implement a "heliolithography" approach in which a liquid photopolymer is cured with focused radiation while the build platform is continuously rotated and raised. Accordingly, the object geometry can be continuously built up along a spiral build path. Examples of such systems are described in U.S. Patent Publication No.

2014/0265034, corresponding to U.S. Pat. No. 9,321,215, the disclosures of which are incorporated herein by reference in its entirety.

Figure 2:
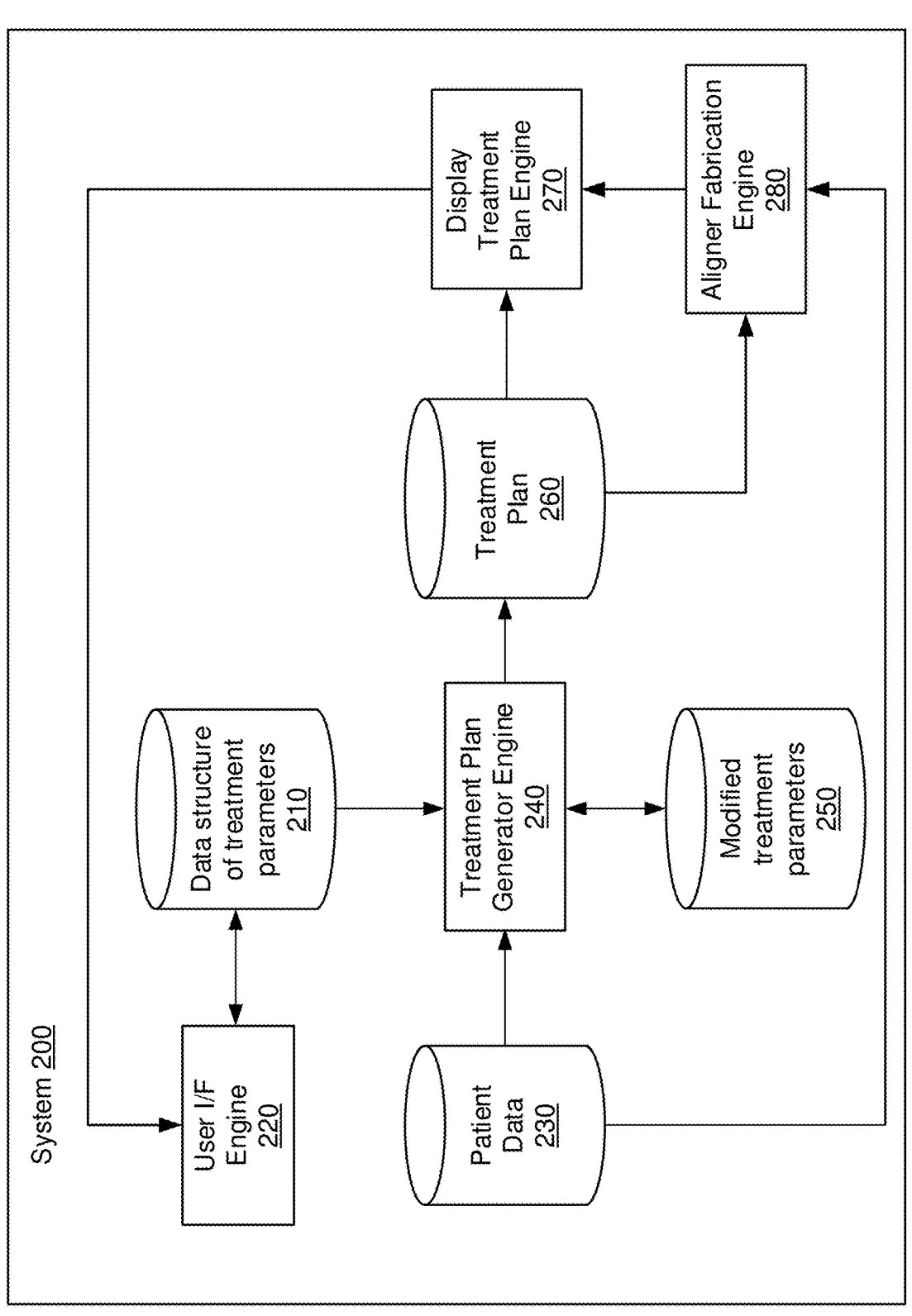
FIG. 2 is a diagram showing an example of a system.

The appliance fabrication system(s) 110 may include one or more elements of the aligner fabrication engine(s) 280 shown in FIG. 2.

The systems of the device planning environment 100 may operate to provide customized GUIs related to treatment planning. In some implementations, the treatment planning interface system(s) 104, the CPM system(s) 106 and the treatment planning system(s) 108 may operate to create treatment templates expressed according to treatment domain-specific protocols as follows. The CPM system(s) 106 may gather unstructured representations of treatment preferences from the treatment planning interface system(s) 104 through telephonic interviews, email exchanges, messages, conversations memorialized in notes, etc. A technician or an automated agent may use the tools on the CPM system(s) 106 to create treatment templates for a user in accordance with treatment domain-specific protocols. The CPM system(s) 106 may also validate the treatment templates to verify that the treatment templates accord with a given user and/or treatment outcome. The CPM system(s) 106 may provide the treatment templates to the treatment planning system(s) 108 for storage and/or use in execution.

Additionally, the treatment planning interface system(s) 104, the treatment planning system(s) 108, and/or the appliance fabrication system(s) 110 may operate to provide treatment plans and/or appliances for a given patient. As noted herein, the treatment planning interface system(s) 104 may gather patient data. With the patient data, a user whose treatment preferences were previously memorialized with a treatment template may gather one or more treatment plans using the engines in the treatment planning system(s) 108. The treatment planning system(s) 108 may gather treatment templates and parse these treatment templates using the treatment domain-specific protocols in order to efficiently and effectively generate customized GUI elements that express treatment preferences in the context of a treatment plan. The user may interact with the treatment plan using the treatment planning interface system(s) 104. In various implementations, the user and/or the treatment planning system(s) 108 provide instructions to fabricate appliances with the appliance fabrication system 110.

FIG. 2 is a diagram showing an example of a system 200; the system 200 may be incorporated into a portion of another system (e.g., a general treatment planning system) and may therefore also be referred to as a sub-system. In any of the method and apparatuses described herein, the system/sub-system may be invoked by a user control, such as a tab, button, etc., as part of treatment planning system, or may be separately invoked.

In FIG. 2, the system 200 may include a plurality of engines and datastores. A computer system can be implemented as an engine, as part of an engine or through multiple engines. As used herein, an engine may include one or more processors or a portion thereof. A portion of one or more processors can include some portion of hardware less than all of the hardware comprising any given one or more processors, such as a subset of registers, the portion of the processor dedicated to one or more threads of a multithreaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users' access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in nontrivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The system/sub-system 200 may include or be part of a computer-readable medium, and may include a user interface (I/F) engine 220. The user I/F engine 220 may allow a user to interact with one or more software modules. As used herein, a user may refer to a doctor, dentist, or other clinician associated with determining, providing or generating a treatment plan. In some examples, the user I/F engine 220 may display interactive dialog boxes to the user. In turn, the user may interact with the dialog boxes to indicate choices and/or decisions regarding a patent's treatment plan and/or a doctor's treatment preferences. In some variations, the dialog boxes may enable the user to modify part or portions of the patient's treatment plan and/or the doctor's treatment preferences. In some other variations, the user I/F engine 220 may enable the user to modify the patient's treatment plan and/or the doctor/s treatment preferences within a data structure (e.g., a datastore). Thus, the user I/F engine 220 may enable the user to read, modify, and/or write data within any feasible datastore. Alternatively, or in addition, the user I/F engine 220 may enable the user to review, accept, reject, and/or apply any modifications to treatment preferences or treatment plans.

The system/subsystem 200 may also include a treatment plan generator engine 240. The treatment plan generator engine 240 may generate a treatment plan to provide dental or orthodontic treatment for a patient. In some examples, the treatment plan generator engine 240 may generate a patient's treatment plan based at least in part on patient data and a doctor's treatment preferences. Thus, the treatment plan generator engine 240 may accept or receive a data structure including treatment preferences and a digital model of the patient's teeth to generate a treatment plan. In some variations, the treatment plan generator engine 240 may store modified treatment parameters. The modified treatment parameters may be based on a doctor's treatment preferences as modified by the doctor (or any other feasible user) via the user I/F engine 220. In some examples, the treatment plan generator engine 240 may store the treatment plan in an applicable datastore. Furthermore, the modified treatment parameters may be stored in a dental protocol language.

In some examples, the treatment plan generator engine 240 may enable a clinician to simulate aspects of a treatment plan associated with teeth whitening procedures. For example, the treatment plan generator engine 240 may receive or retrieve patient data 230 that includes a two-dimensional (2D) or three-dimensional (3D) image of the patient's dentition. The image may include color information associated with the color (shade) of the patient's teeth. The treatment plan generator engine 240 may simulate teeth whitening procedures on the patient's teeth and display 2D and/or 3D dental images that enable the clinician to show the patient possible outcomes. Simulation of the teeth whitening procedures is described in more detail in conjunction with FIGS. 5-8.

The treatment plan generator engine 240 may generate a teeth whitening plan based on the simulated teeth whitening procedures. The teeth whitening plan may be stored in a treatment plan datastore 260.

The system/subsystem 200 may also include a display treatment plan engine 270. The display treatment plan engine 270 may enable the doctor to review and/or approve a patient's treatment plan, particularly a treatment plan as modified via the user I/F engine 220. In some examples, the display treatment plan engine 270 may display before, during, and after representations or visualizations of a patient's teeth as treated by one or more aligners that are based on a treatment plan generated by the treatment plan generator engine 240.

The system/subsystem 200 may also include an aligner fabrication engine 280. The aligner fabrication engine 280 may process patient data 230 and a treatment plan to generate one or more (in some cases a series of) aligners, including clear dental aligners to treat a patient's teeth. The aligners may be generated by any feasible method. In some variations, the aligner fabrication engine 280 may generate images or renderings associated with one or more dental aligners. These images/renderings may be displayed to the user through the display treatment plan engine 270. In some examples, the aligners may be fabricated by the appliance fabrication system 110 of FIG. 1.

The system/subsystem 200 may include any number of datastores. For example, the system/subsystem 200 may include a data structure of treatment parameters 210. In some variations, the data structure may be expressed in a dental protocol language. The use of a dental protocol language (sometimes referred to as a domain-specific orthodontic treatment language) that is both human and machine readable, and is tailored to orthodontic treatment provides a high level of flexibility and efficiency in orthodontic treatment planning and orthodontic device fabrications. For example, the dental protocol language enables automation of many different orthodontic treatment planning protocols, and facilitates the communication between users (e.g., doctors), technicians and R&D personnel. It adds more flexibility than simple parameter files because it includes semantics for conditional statement, and because it exposes more configuration options. The dental protocol language may be used for editing and for visualizing the treatment planning protocol (TPP), and may therefore be concise and easy to understand. The dental protocol language scripts may be automatically translated into executable code in an interpreted language.

The treatment parameters may describe a doctor's treatment preferences. In some examples, the treatment parameters may be predefined. For example, the doctor's treatment preferences may be based on a predefined personalized plan that may have been customized by and/or for the doctor to indicate one or more treatment preferences. In some examples, the doctor's treatment preferences may be predefined based on prior treatment plans approved by the doctor as used on other patients. In some other examples, the doctor's treatment preferences may be predefined based on those of a Key Opinion Leader (KOL). A Key Opinion Leader's treatment preferences may be those associated with a particular clinician. In some other examples, the doctor's treatment preferences may be predefined based on Regional Automated Defaults (RAD). RAD preferences may be associated with a geographic or other region with which the doctor wishes to follow. In still other examples, the doctor's treatment preferences may be predefined based on Dental Service Organization (DSO) templates. A DSO template may provide treatment preferences that are associated with and suggested by a doctor's DSO. In some examples, the predefined treatment parameters may be stored or maintained in a library of clinician treatment preferences. The treatment parameters may be stored, recorded, and/or indexed by the clinician.

The system/subsystem 200 may include a datastore of patient data 230. The patient data 230 may include any feasible patient data including scans, x-rays, dental imaging, patient physiological details (age, weight, gender), and the like. In some examples, patient data may include a digital model of the patient's teeth.

The system/subsystem 200 may include a datastore of modified treatment parameters 250. For example, the treatment plan generator engine 240 may store modified treatment parameters in the modified treatment parameter datastore 250. In some cases, the modified treatment parameters may be appended into the modified treatment parameter datastore 250. The treatment parameters may be modified through the user I/F engine 220 interacting the data structure of treatment parameters 210.

The system/subsystem 200 may include the treatment plan datastore 260. The treatment plan datastore 260 may include a treatment plan for a patient based on treatment parameters in the modified treatment parameter datastore 250.

While working with a patient to develop an orthodontic dental plan, showing the patient how teeth whitening (more specifically teeth whitening procedures) can improve their smile may be helpful. Accurate renderings may allow the patient to visualize how one or more teeth whitening procedures can affect their smiles. Conventional whitening simulations however may tend to produce artificial or non-life like images that may confuse the patient or set wrong expectations.

In some examples, a teeth whitening simulation may use a patient's dental scan to provide initial data. The scan may include color information in a first (e.g., native) color space, such as red, green, blue (RGB). The teeth whitening simulation may convert the color information from the first color space to a second color space. The second color space may enable teeth whitening simulations to be more easily performed that the first color space.

The color information in the second color space may be used as a basis for teeth whitening simulations. In some examples, adjustments to the color information in the second color space may be performed in accordance with predetermined relationships between different color components. Furthermore, in some examples whitening simulation 2D dental images may be processed differently than 3D dental images. Thus, the color component information associated with 2D dental images may be processed differently than the color component information associated with 3D dental images. Additionally, in some examples, a patient's dental scan data may be associated with a reference dental shade. In this manner, subsequent whitening simulations may be performed with respect to the reference dental shade.

Figure 3:
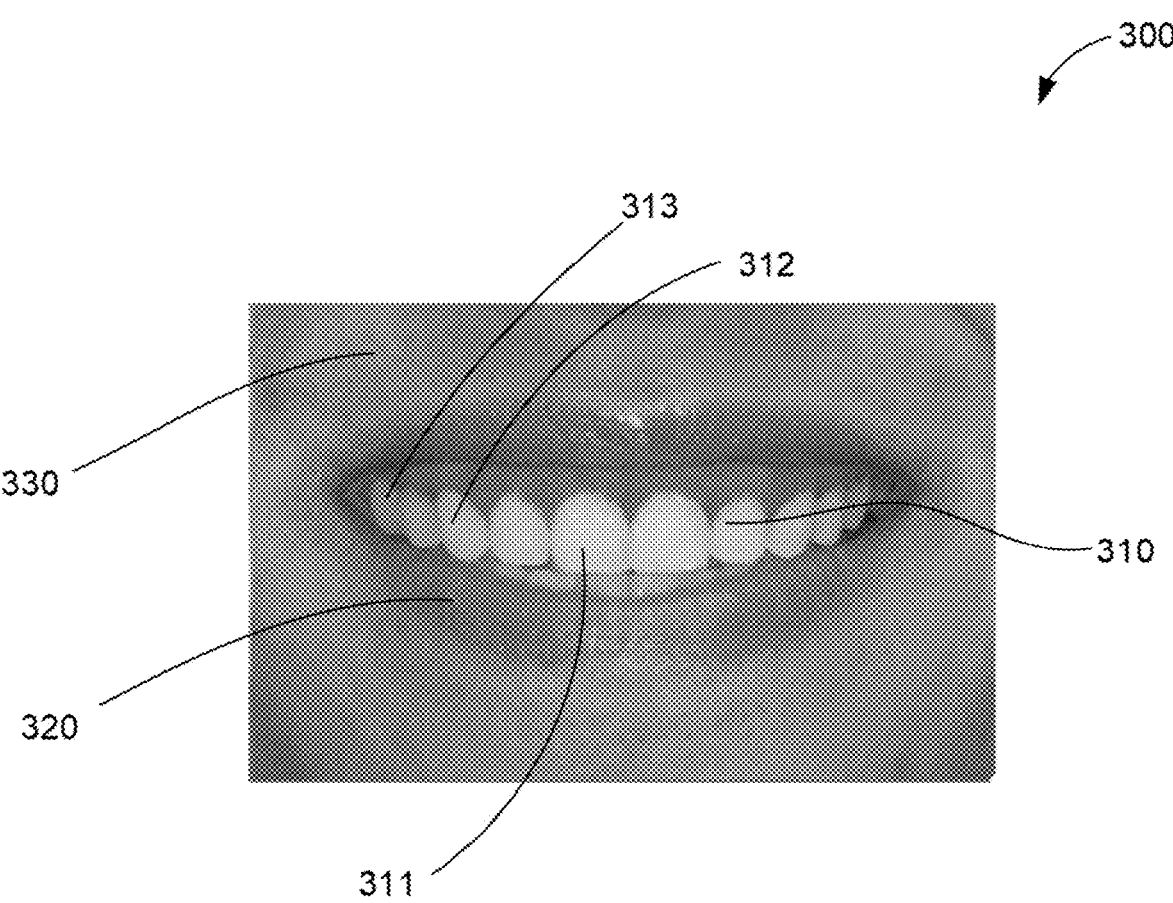
FIG. 3 shows an example illustration of a 2D dental image.

FIG. 3 shows an example illustration of a 2D dental image 300. The image 300 may include teeth 310, lips 320, and a portion of a face 330. Because of facial features, lighting on the teeth 310 may not be flat and uniform. For example, structure of the lips 320 may allow more light to reach incisors 311 compared to canines 312 and/or premolars 313. As a result, the human eye naturally perceives that the most forward teeth (incisors 311, for example) may appear brighter than other teeth (canines 312 and/or premolars 313, for example). Conventional teeth whitening simulations however may uniformly adjust tooth color within teeth 310. A resulting simulated whitened dental image may look artificial or contrived possibly confusing or misleading the patient regarding possible results of a teeth whitening procedure.

Some tooth whitening simulations may take into account a non-uniform light distribution on a dental image. An example tooth whitening solution is described below in conjunction with FIG. 5.

Oftentimes, a clinician may use a reference dental shade to describe tooth colors. A reference dental shade associates a particular tooth color with a particular label. Some manufacturers may provide a dental shade guide that includes a plurality of labeled color samples. Using the dental shade guide, a clinician can easily determine and describe a patient's tooth color. Moreover, the clinician can use the dental shade guide to discuss teeth whitening procedures with the patient.

FIGS. 4A and 4B show example reference dental shade guides. A reference dental shade guide may show a number of possible tooth colors and/or shades and associate a label of name with a particular shade or color. FIG. 4A shows a reference dental shade guide 400 that includes sample tooth materials in selected colors displayed linearly. FIG. 4B shows a reference dental shade guide 410 that includes sample tooth materials in selected colors displayed on a semi-circle. As shown, each sample shade is associated with a shade number that may be used to identify a particular color/shade.

Figure 5:
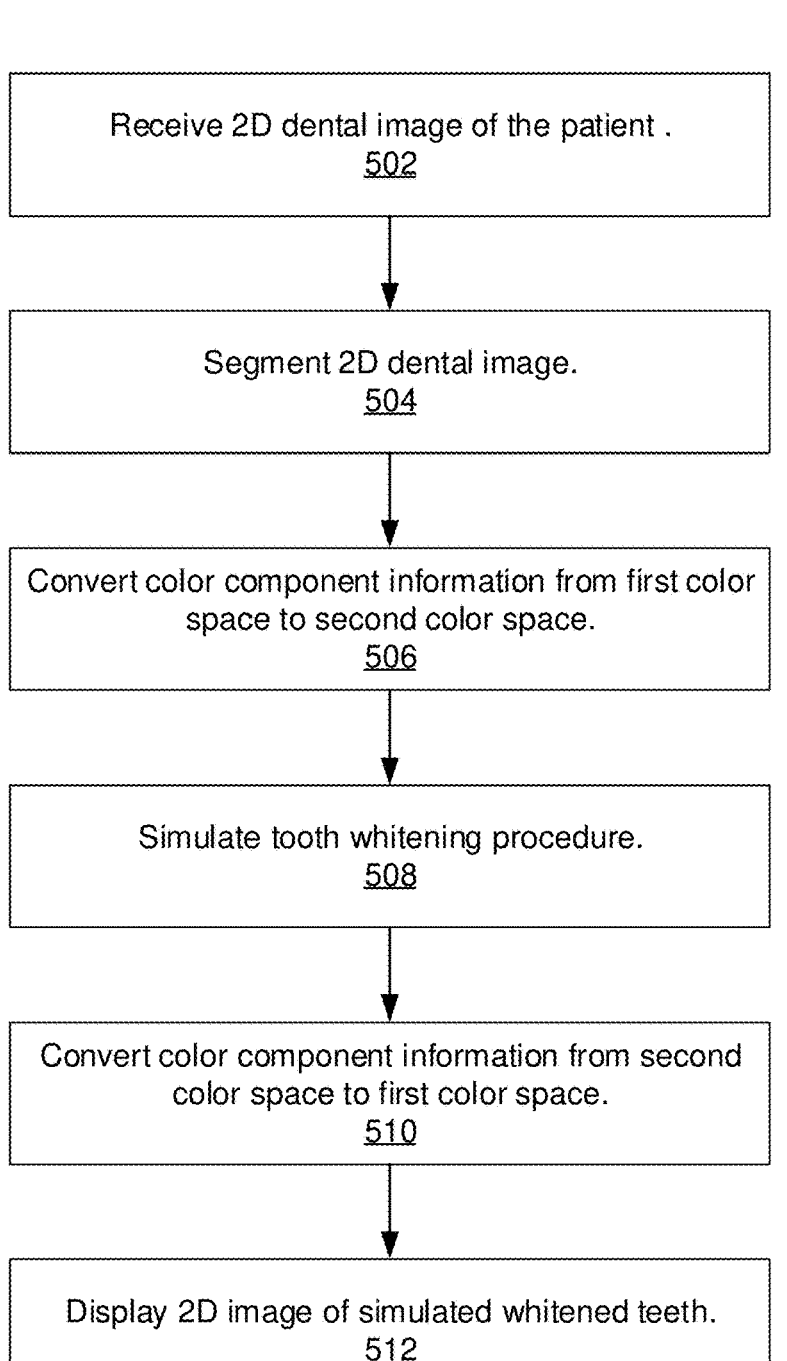
FIG. 5 is a flowchart showing an example method for simulating teeth whitening operations.

FIG. 5 is a flowchart showing an example method 500 for simulating and displaying a dental whitening treatment. In particular, the method 500 may be used to simulate teeth whitening on a 2D dental image. Some examples may perform the operations described herein with additional operations, fewer operations, operations in a different order, operations in parallel, and some operations differently. The method 500 is described below with respect to the system 200 of FIG. 2, however, the method 500 may be performed by any other suitable system or device.

The method 500 begins in block 502 as the system 200 receives or obtains a 2D dental image of the patient. The 2D dental image may be captured with any feasible camera or scanning device. In some examples, the 2D dental image may be stored in or with the patient data 230. The 2D dental image may include color components (color information) associated with a first (e.g., a native) color space. A typical first color space for a 2D dental image may be red, green, blue (RGB) although other color spaces are possible such as luminance, blue difference, red difference (YCbCr), cyan, magenta, yellow (CMY) and the like.

Next, in block 504, the system 200 may segment the 2D dental image. In some examples, the 2D dental image may be segmented into dental structures (e.g., teeth, gums, bones, and the like). Some example segmented dental structures may include individual representations of teeth and (in some cases) jaw structures. Segmentation may be performed manually (e.g., by a user or clinician) or automatically (e.g., by a processor executing a segmentation algorithm). In some examples, the segmented dental structures may include labels associating a tooth number with a particular segmented tooth. For example, a tooth number may identify a particular tooth within a patient's dental arch.

Next, in block 506, the system 200 may convert color component information associated with the 2D dental image from the first color space to a second color space. As described above, the dental image may include color information in a native color space. However, a second color space may allow for easier and more accurate teeth whitening simulations. For example, accurate teeth whitening procedures may more easily be simulated in an International Commission on Illumination color space (CIELAB) which may sometimes be abbreviated as L*a*b.

In the L*a*b color space, color may be represented by a perceptual lightness component (L) (sometimes referred to as simply "lightness component"), a red/green color component (a), and a blue/yellow color component (b). Teeth whitening simulations may operate substantially on the lightness component (L) and the blue/yellow color component (b) while holding the red/green color component relatively fixed. In some examples, a teeth whitening simulation may increase the lightness component while changing the blue/yellow color component away from yellow color component and toward the blue color component.

Next, in block 508, the system 200 may simulate a teeth whitening procedure. When describing teeth whitening procedures, a clinician may refer to changing or lightening a "shade" of the patient's teeth. The shade may refer to a particular predefined color or shade as described by any feasible reference dental shade. By comparing colors from a reference dental shade guide the patient's teeth, the clinician can determine a label associated with the current shade and determine, in some cases, how many whitening steps may be needed to attain a desired shade. In this manner, a clinician can describe a current and/or a desired tooth color or shade with respect to labels on the reference dental shade guide.

In some examples, performing one step of whitening treatment may be simulated by increasing the perceptual lightness by 1%. In many computer representations of L*a*b color components, the lightness component may be represented by an eight bit number ranging from 0 to 255 (in decimal). Therefore, a 1% change in L may be equivalent to a change of about 2.55 L.

Performing one step of a whitening treatment may also change the value of the blue/yellow color component (b) by about 3, toward blue and away from yellow. In many computer representations of L*a*b color, the blue/yellow color component may also be represented by an eight bit number. A value of 128 may be neutral (no blue or yellow color). Values less than 128 may be toward a blue color and values greater than 128 may be toward a yellow color. Thus, reducing the blue/yellow color component by about 3 (in some cases about 2.55) may be used to simulate one step of a whitening treatment. In some variations, a limit or upper bound may be used to limit changes to the blue/yellow color components. Thus, maximum and minimum values to the blue/yellow color components may be used to prevent teeth whitening simulations from producing poor images. In some examples, an upper bound of negative eighteen (−18) may be used to limit the blue/yellow color component changes.

Thus, teeth whitening simulations may not rely on independent and/or unbounded (unrestricted) changes in the lightness and blue/yellow color components. Instead, in some examples changes values of the lightness components may be related to changes in values of the blue/yellow color component. For example, one step of a whitening treatment may be simulated by increasing the lightness component by 1% (or about 2.55) and simultaneously decreasing the a component by about 3. Thus, each step of a whitening treatment may be simulated by a simultaneous and related change of the lightness and blue/yellow color components.

Notably, large changes in the lightness component may make the teeth appear abnormally bright while unbound changes in the blue/yellow color component may make the teeth appear too blue or too yellow. Thus, when simulating teeth whitening procedures, adjustment to lightness and the blue/yellow color components may be limited to a predetermined amount. For example, changes to the blue/yellow color component may be limited to −9, −18, or any other feasible amount. In some examples, the limit to a lightness component or blue/yellow component change may be determined by a user or clinician.

In many 2D images, the apparent brightness of a patient's teeth may not be uniform. Physical structures or features such as lips, cheeks, and the like may make some teeth appear darker than others. This apparent brightness (or darkness) may be caused by the physical structures or features limiting available light with respect to certain teeth. Thus, teeth such as canines or premolars may appear darker than teeth such as incisors.

In some variations, changes to the blue/yellow color component may be guided by lightness component values associated with each tooth. In other words, changes to the blue/yellow component to simulate a teeth whitening procedure may vary for each tooth instead of being a uniform change to blue/yellow component values for all teeth.

In some examples, to determine blue/yellow component values, the system 200 may determine which tooth is associated with the largest lightness component (e.g., a maximum valued perceptual lightness component). Typically, teeth most central (in the center of) the dental image, such as incisors, may have the largest lightness component. The change to the blue/yellow component for each tooth may be expressed by $$\Delta b\% = -3(\text{toothL}/\text{maxL}) \qquad \text{eq. 1}$$

where: maxL is the largest lightness component value associated with a tooth in the 2D image; and toothL is the lightness component value of any particular tooth.

Thus, when the tooth is a front tooth (e.g., an incisor, so that toothL is maxL), then the delta b is the full −3. When the tooth is a back tooth (e.g., a back molar), toothL is much smaller, so delta b is say around −1, hence a much smaller change, which makes it less likely to look like a bluish dark tooth.

In some variations, any other feasible equation or relationship may be used to adjust a relative change in the blue/yellow color component of each tooth. For example, although "−3" is used in equation 1 above, the change in the blue/yellow color component may be higher or lower than 3. Accordingly, using the example equation above (or any other feasible equation), the blue/yellow component values for each tooth may be adjusted based on a difference between the largest lightness component value for any tooth in the 2D dental image and the lightness component value for the tooth for which whitening is being simulated.

In some examples, multiple "steps" of teeth whitening may be simulated by multiplying 1% and −3 by an integer number indicating the number of whitening steps to be simulated. For example, 3 treatment steps could be simulated by a 3% increase in the lightness component and a −9 decrease in the blue/yellow color component (which again may be further modified by the equation 1 above).

In some embodiments, the number of teeth whitening that is simulated may be variable and controlled though a user interface control object, such as a slider, radio knob, or the like. In this manner, a clinician may vary how many steps of teeth whitening are simulated, advantageously allowing the clinician to show variable and different whitening outcomes to the patient.

Next, in block 510 the system 200 may convert color component information from the second color space to the first color space. That is, the system 200 may convert the color components that has been processed to simulate a teeth whitening procedure from the L*a*b color space back to the RGB (or other native or first) color space.

Next, in block 512 the system 200 may display the 2D dental image of simulated whitened teeth. In some examples, the system 200 may also display a visual whitening control slider, knob, or the like on a touch sensitive user display. The clinician nay adjust the slider to change how whitening (e.g., how many whitening steps) is simulated.

Some aspects of simulating teeth whitening with respect to 3D dental images may be simpler than simulating teeth whitening with respect to 2D dental images. For example, 3D dental images may have a relatively more even light, particularly when there are no physical structures or features that may affect the appearance of ambient light on the teeth.

FIG. 6 shows an example illustration of a 3D dental image 600. The 3D dental image 600 may be partial (as shown) or may include all the teeth of the patient. The 3D dental image 600 may include any number of vertices, meshes, and/or triangles. In some variations, each vertex, mesh, and/or triangle may have color component information. For example, each vertex, mesh, and triangle may include a (native) RGB color component. Because the 3D dental image 600 generally lacks physical structures or features that would fully or partially block light, a teeth whitening simulation may be applied uniformly to all teeth in the 3D dental image 600.

FIG. 7 is a flowchart showing an example method 700 for simulating and displaying a teeth whitening treatment. In particular, the method 700 may be used to simulate teeth whitening on a 3D dental image. The method 700 is described below with respect to the system 200 of FIG. 2, however, the method 700 may be performed by any other suitable system or device.

The method 700 begins in block 702 as the system 200 receives or obtains a 3D dental image of the patient. The 3D dental image may be captured with any feasible camera or scanning device. In some examples, the 3D dental image may be stored in or with the patient data 230.

Next, in block 704 the system 200 may determine color component information associated with each vertex and mesh of the 3D dental image. The 3D dental image may include color components (color information) associated with a first (e.g., native) color space. A typical first color space for a 3D dental image may be red, green, blue (RGB) although other color spaces are possible. The color information may be associated with each vertex, mesh, and triangle of the 3D dental image.

Next, in block 706, the system 200 may convert color component information associated with the 3D dental image from the first color space to a second color space. As described above, some teeth whitening simulations may be more easily performed in the L*a*b color space. Thus, the system 200 can convert the 3D dental image from the first (native) color space into the L*a*b color space for subsequent teeth whitening simulations.

Next, in block 708 the system 200 may simulate a teeth whitening procedure. For example, one step of teeth whitening treatment may be simulated by a 1% increase in the lightness components and a −3 reduction of the blue/yellow color components of the color components of the 3D dental image. Multiple steps of whitening treatment may be simulated by repeatedly increasing the perceptual lightness component and decreasing the blue/yellow color component. Although described here as a ratio of a 1% change to the perceptual lightness component to a −3 reduction of blue/yellow color components, in other examples the ratio be predetermined and realized with any other values.

In some examples, changes to the perceptual lightness components and blue/yellow color components may be linked. That is, a change in perceptual lightness values will accompany a change in the blue/yellow color component values. In some other examples, changes to the perceptual lightness components and the blue/yellow color components may be independent of each other. As described above, the color component information may be associated with each vertex, mesh, and/or triangle of the 3D dental image. Thus, the teeth whitening simulation may modify the lightness and blue/yellow color components for each vertex, mesh, and/or triangle.

In some variations, multiple steps of a teeth whitening treatment may be simulated. For example, multiple "steps" of teeth whitening may be simulated by multiplying a 1% change in lightness and −3 change in blue/yellow components by an integer number indicating the of whitening steps to be simulated. In any of the examples, the change to the lightness component and/or the blue/yellow component may be limited to a maximum amount of change (e.g., an upper bound). The maximum amount of change or upper bound may be any feasible amount.

Next, in block 710, the system 200 may convert color component information from the second color space to the first color space. That is, the system 200 may convert color components of 3D dental image that has been processed to simulate a teeth whitening procedure from the L*a*b color space back to a native color space.

Next, in block 712 the system 200 may display the 3D dental image showing the teeth whitening simulation. In some examples, the system 200 may also display a visual whitening control slider, knob, or the like on a touch sensitive user display. The clinician may adjust the slider to change how whitening (e.g., how many whitening steps) is simulated.

Any particular set of reference dental shades may have a predetermined relationship with color components in the L*a*b color space. By associating color data of the dental image with characterized dental shade, the system 200 can simulate teeth whitening procedures based not only on a received image data, but also on color component values associated with one or more reference dental shades. An example procedure is discussed below with respect to FIG. 8.

FIG. 8 is a flowchart showing an example method 800 for simulating and displaying a teeth whitening treatment. In particular, the method 800 may use reference dental shades to simulate teeth whitening on 2D or 3D dental images. The method 800 is described below with respect to the system 200 of FIG. 2, however, the method 800 may be performed by any other suitable system or device.

The method 800 begins in block 802 as the system 200 receives or obtains a dental image of a patient. The dental image may be a 2D or a 3D image. In some examples, the dental may be a full image (e.g., include all of the patient's teeth) or a partial image (e.g., include a subset of the patient's teeth). The dental image may also include color information (e.g., color component information). For example, the dental image may include color component information described in a first (native) color space. The color component information may be associated with individual teeth (for 2D dental images) or vertex, mesh, and triangles (for 3D dental images).

Next, in block 804, the system 200 receives a color assessment of the patient's teeth. The color assessment may be performed by a clinician or doctor where a dental shade, selected from a set of reference dental shades, is matched to the tooth color of the patient. As described with respect to FIGS. 4A and 4B, a clinician may use a reference dental shade guide to determine a color assessment associated with patient's current tooth color.

Next, in block 806 the system 200 converts the color component information of the received dental image from the first color space to a second color space. As described above, some teeth whitening simulations may be more easily or accurately performed in the L*a*b color space. Thus, the system 200 can convert color component information of the 2D or 3D dental image from the first (native) color space into the L*a*b color space for subsequent teeth whitening simulations.

Next, in block 808, the system 200 associates the dental image (received in block 802) with the clinician's color assessment (received in block 804). In some embodiments, any set of reference dental shades may be characterized with respect to L*a*b color components. Thus, each dental shade on the reference dental shade guide may be associated with unique L*a*b color components. In block 808, the system 200 can associate or determine actual L*a*b components of the dentition image based on the color assessment provided by the clinician.

Next, in block 810 the system 200 simulates a teeth whitening procedure. The teeth whitening simulation may simulate a whitening procedure that begins with a current dental shade and shows whiter shades based on any number of simulated whitening treatments. For example, a characterization of the reference dental shades may be used to predict the color of the patient's teeth after a teeth whitening procedure. During the characterization of any particular set of reference dental shades, each reference dental shade may be examined to determine its L*a*b color components. For example, a D3 shade may have L*a*b components of (L1, a1, b1) and a C2 shade may have L*a*b components of (L2, a2, b2). If the patient has an initial dental shade of D3 and wishes to whiten his/her teeth to a shade of C2, then the system 200 may determine color component difference values between C2 and D1 (determine a difference (L1, a1, b1)–(L2, a2, b2)). The system 200 may then add the determined difference to current L*a*b values of the dental image. In this manner, a new color component values are determined to reflect a simulated teeth whitening procedure.

In some examples, the simulated teeth whitening procedure may whiten from a first shade to one or two shades whiter with respect to the set of reference dental shades. In some other examples, the simulated teeth whitening procedure may simulate a variable (e.g., fractional or non-integer) amount of teeth whitening. In some variations, the system 200 may present a slider or knob on a display that the clinician interacts with to select a variable amount teeth whitening to simulate. In some examples, the simulated teeth whitening procedure may be applied to 2D dental images similar to as described with respect to FIG. 5 or to 3D dental images as described with respect to FIG. 7.

Next, in block 812 the system 200 converts the color component information from the second color space to the first color space. For example, the updated color information as determined in block 810 may be in the L*a*b color space. In block 812, the system may convert the color component information from the L*a*b to the RGB (or other native) color space. The second color space may be easier with which to render images for display.

Next, in block 814 the system 200 displays a dental image of the simulated whitened teeth. In some variations, the system 200 may display a 2D or 3D dental image showing the teeth whitening simulation. In some examples, the system 200 may also display a visual whitening control slider, knob, or the like on a touch sensitive user display. The clinician nay adjust the slider to change how whitening (e.g., how many whitening steps) is simulated.

In some variations, the method of FIG. 8 may be combined with the method of FIG. 4 or FIG. 6. For example, instead of using the color component relationship captured by equation 1, the system 200 may use the color component relationship determined though the characterization of any one particular set of reference dental shades.

Figure 9:
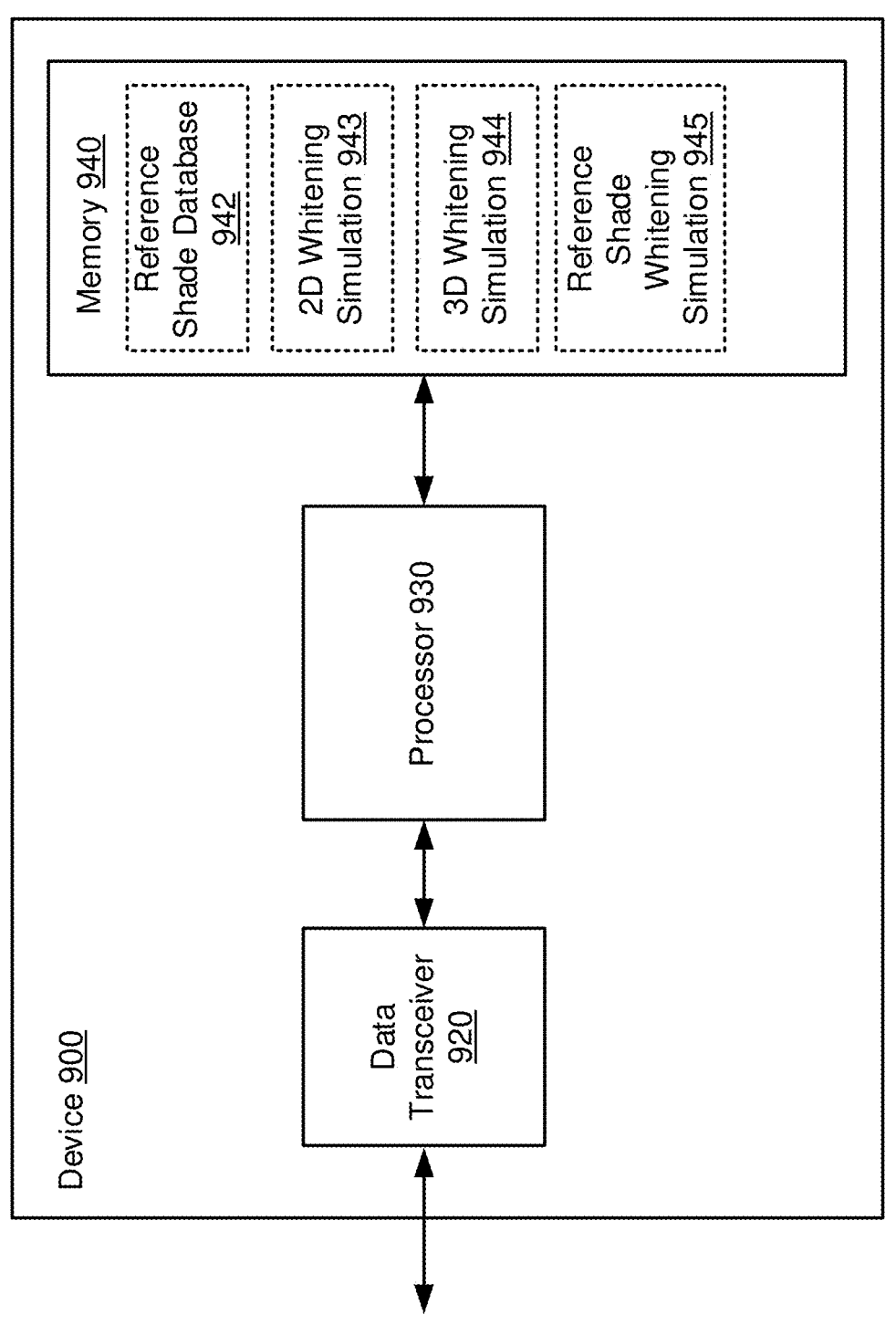
FIG. 9 shows a block diagram of a device 900 that may be one example of the system of FIG. 2.

FIG. 9 shows a block diagram of a device 900 that may be one example of the system 200 of FIG. 2. The device 900 may include a data transceiver 920, a processor 930, and a memory 940.

The data transceiver 920, which is coupled to the processor 930, may be used to transmit and receive data with any other devices, systems, storage devices, or the like. For example, the data transceiver 920 may include any feasible wired and/or wireless circuits or devices that may be used to transmit and/or receive data. In some examples, the data transceiver 920 may include one or more wired interfaces to enable communications through any feasible wired infrastructure such as ethernet networks including the Internet. In some variations, the data transceiver 920 may include one or more wireless interfaces to communicate with other devices. The wireless interfaces may implement Bluetooth, WiFi, cellular (4G, 5G or other Long Term Evolution (LTE) protocol), ZigBee, or any other feasible communication protocol. In some examples, the data transceiver 920 may couple the device 900 to cloud resources including storage and processing resources.

The processor 930, which is also coupled to the memory 940, may be any one or more suitable processors capable of executing scripts or instructions of one or more software programs stored in the device 900 (such as within memory 940).

The memory 940 may include reference shade database 942 that may be used to locally store reference dental shade characteristics. For example, the reference shade database 942 may include color component values (determined with respect to any particular color space) associated with each reference dental shade.

The memory 940 may also include a non-transitory computer-readable storage medium (e.g., one or more nonvolatile memory elements, such as EPROM, EEPROM, Flash memory, a hard drive, etc.) that may store the following software modules: a 2D whitening simulation module 943; a 3D whitening simulation module 944; and reference shade whitening simulation module 945. Each software module includes program instructions that, when executed by the processor 930, may cause the device 900 to perform the corresponding function(s). Thus, the non-transitory computer-readable storage medium of memory 940 may include instructions for performing all or a portion of the operations described herein.

The processor 930 may execute the 2D whitening simulation module 943 to simulate the whitening of a 2D image of a patient's teeth. In some examples, execution of the 2D whitening simulation module 943 may receive or obtain a patient's 2D dental image, and simulate a teeth whitening procedure by adjusting or modifying one or more color components. In some variations, execution of the 2D whitening simulation module 943 may execute part or all of the operations described with respect to FIG. 5.

The processor 930 may execute the 3D whitening simulation module 944 to simulate the whitening of a 3D image of a patient's teeth. In some examples, execution of the 3D whitening simulation module 944 may receive or obtain a patient's 3D dental image, and simulate a teeth whitening procedure by adjusting or modifying one or more color components. In some variations, execution of the 3D whitening simulation module 944 may execute part or all of the operations described with respect to FIG. 7.

The processor 930 may execute the reference shade whitening simulation module 945 to simulate the whitening of an image of a patient's teeth. In some examples, execution of the reference shade simulation module 945 may receive or obtain a patient's 2D or 3D dental image, and simulate a teeth whitening procedure by adjusting or modifying one or more color components. In some variations, execution of the 3D whitening simulation module 944 may execute part or all of the operations described with respect to FIG. 5, 7, or 8.

FIGS. 10A-10D, 11A-11D, 12A-12D, 13A-13D, 14A-14D and 15A-15D each illustrate examples of simulated teeth whitening as described herein. The original b value is shown for each set, as well as the original (FIGS. 10A, 11A, 12A, 13A, 14A, and 15A), no whitening (FIGS. 10B, 11B, 12B, 13B, 14B and 15B), median (FIGS. 10C, 11C, 12C, 13C, 14C and 15C) and high whitening (FIGS. 10D, 11D, 12D, 13D, 14D and 15D) are shown.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of creating an image simulating a dental whitening treatment, the method comprising:

receiving a two-dimensional (2D) image of a patient's oral cavity;

identifying one or more regions of the 2D image corresponding to teeth in the patient's oral cavity;

converting the 2D image from a first color space to a CIELAB color space;

selecting a change in a blue-yellow color value (delta b value) with which to whiten the patient's teeth, wherein the delta b value is selected to increase a blue hue and decrease a yellow hue in the 2D image;

identify a threshold lightness value of individual teeth in the 2D image;

transforming the 2D image in the CIELAB color space by adjusting delta b values of each tooth based, at least in part, on an evaluation of a lightness value of each tooth relative to the threshold lightness value to form a whitened 2D image, wherein adjusting the delta b values comprises limiting the delta b values to within a predetermined range; and outputting the whitened 2D image.

2. The method of claim 1, wherein the 2D image of the patient's oral cavity comprises a 2D image of the patient's teeth.

3. The method of claim 1, wherein the first color space comprises a native color space.

4. The method of claim 1, wherein the threshold lightness value comprises a maximum color value of the individual teeth in the 2D image.

5. The method of claim 1, wherein the evaluation of the lightness value comprises an evaluation of a ratio of the lightness value of each tooth relative to the threshold lightness value.

6. The method of claim 1, wherein the evaluation of the lightness value comprises an evaluation of a ratio of the lightness value of each tooth relative to a maximum lightness value.

7. A method of creating an image corresponding to a dental whitening treatment, the method comprising:

receiving a two-dimensional (2D) image of a patient's teeth;

identifying individual teeth within the 2D image of the patient's teeth;

converting the 2D image from a native color space into a CIELAB color space;

selecting a change in a blue-yellow color value (delta b value) with which to whiten the patient's teeth, wherein the delta b value is selected to increase a blue hue and decrease a yellow hue;

identify a maximum lightness value from the patient's teeth;

transforming the 2D image in the CIELAB color space by adjusting delta b values of each tooth by a modified version of the delta b value that is scaled for each tooth based on a ratio of a lightness value of each tooth relative to the maximum lightness value to form a whitened 2D image, wherein adjusting the delta b values comprises limiting the delta b values to within a predetermined range; and outputting the whitened 2D image.

8. The method of claim 7, wherein identifying the individual teeth comprises segmenting the 2D image of the patient's teeth.

9. The method of claim 7, further comprising selecting an increase in a lightness value (delta L) with which to whiten the patient's teeth, and wherein transforming the 2D image further comprises scaling the lightness value of each tooth based on the ratio of the lightness value of each tooth relative to the maximum lightness value.

10. The method of claim 7, wherein transforming the 2D image further comprises converting the whitened 2D image from the CIELAB color space back into the native color space so that outputting the whitened 2D image comprises outputting the whitened 2D image in the native color space.

11. The method of claim 7, wherein selecting the change in the delta b value comprises identifying one or more increments for adjusting one or both of the delta b values of each tooth and the lightness value of each tooth.

12. The method of claim 11, wherein adjusting the delta b values of each tooth by the modified version of the delta b value comprises adjusting the delta b values by a multiple of the identified one or more increments.

13. The method of claim 11, wherein transforming the 2D image in the CIELAB color space does not change a red-green color value of each tooth.

14. A system for simulating a teeth whitening procedure, the system comprising:

one or more processors; and a memory configured to store instructions that, when executed by the one or more processors, cause the system to:

receive a two-dimensional (2D) image of a patient's teeth;

identify individual teeth within the 2D image of the patient's teeth;

convert the 2D image from a native color space into a CIELAB color space;

select a change in a blue-yellow color value (delta b value) with which to whiten the patient's teeth, wherein the delta b value is selected to increase a blue hue and decrease a yellow hue;

identify a maximum lightness value from the patient's teeth;

transform the 2D image in the CIELAB color space by adjusting delta b values of each tooth by a modified version of the delta b value that is scaled for each tooth based on a ratio of a lightness value of each tooth relative to the maximum lightness value to form a whitened 2D image, wherein adjusting the delta b values comprises limiting the delta b values to within a predetermined range; and output the whitened 2D image.

15. The system of claim 14, wherein the 2D image of the patient's teeth comprises a 2D image of the patient's oral cavity.

16. The system of claim 14, wherein identifying the individual teeth comprises segmenting the 2D image of the patient's teeth.

17. The system of claim 14, wherein the instructions further comprise selecting an increase in a lightness value (delta L) with which to whiten the patient's teeth, and wherein transforming the 2D image further comprises scaling the lightness value of each tooth based on the ratio of the lightness value of each tooth relative to the maximum lightness value.

18. The system of claim 14, wherein transforming the 2D image further comprises converting the whitened 2D image from the CIELAB color space back into the native color space so that outputting the whitened 2D image comprises outputting the whitened 2D image in the native color space.

19. The system of claim 14, wherein selecting the change in the delta b value comprises identifying one or more increments for adjusting one or both of the delta b values of each tooth and the lightness value of each tooth.

20. The system of claim 19, wherein adjusting the delta b values of each tooth by the modified version of the delta b value comprises adjusting the delta b values by a multiple of the identified one or more increments.

21. The system of claim 19, wherein transforming the 2D image in the CIELAB color space does not change a red-green color value of each tooth.

\* \* \* \* \*